United States Patent
Fujii

(10) Patent No.: US 10,234,673 B2
(45) Date of Patent: Mar. 19, 2019

(54) CONFOCAL MICROSCOPE APPARATUS, STITCHED IMAGE CONSTRUCTION METHOD AND COMPUTER-READABLE MEDIUM

(71) Applicant: OLYMPUS CORPORATION, Hachioji-shi, Tokyo (JP)

(72) Inventor: Akihiro Fujii, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 112 days.

(21) Appl. No.: 15/423,879

(22) Filed: Feb. 3, 2017

(65) Prior Publication Data

US 2017/0235119 A1    Aug. 17, 2017

(30) Foreign Application Priority Data

Feb. 17, 2016 (JP) .................................. 2016-028265

(51) Int. Cl.
G02B 21/36  (2006.01)
G02B 21/00  (2006.01)
G06T 11/60  (2006.01)
G02B 21/06  (2006.01)

(52) U.S. Cl.
CPC ......... *G02B 21/367* (2013.01); *G02B 21/008* (2013.01); *G02B 21/0032* (2013.01); *G02B 21/06* (2013.01); *G06T 11/60* (2013.01)

(58) Field of Classification Search
None
See application file for complete search history.

(56) References Cited

U.S. PATENT DOCUMENTS

| 5,932,871 A * | 8/1999 | Nakagawa ........... G02B 21/008 250/201.3 |
|---|---|---|
| 2010/0150472 A1* | 6/2010 | Chen .................... G02B 21/008 382/278 |
| 2011/0116694 A1* | 5/2011 | Gareau .............. G01N 21/6458 382/128 |
| 2012/0019821 A1* | 1/2012 | Chen .................. G02B 21/0032 356/303 |
| 2012/0237137 A1* | 9/2012 | Chen .................... G02B 21/008 382/284 |

(Continued)

FOREIGN PATENT DOCUMENTS

| JP | 2004170572 A | 6/2004 |
| JP | 3847422 B2 | 11/2006 |

*Primary Examiner* — Reza Aghevli
(74) *Attorney, Agent, or Firm* — Holtz, Holtz & Volek PC

(57) ABSTRACT

A confocal microscope apparatus includes an image acquisition unit configured to obtain a first all-in-focus image of each of a plurality of measurement visual field areas constituting a measurement target area in a brightness setting in accordance with the corresponding measurement visual field area, and a stitched image constructor configured to construct a stitched image on the basis of a plurality of second all-in-focus images. The second all-in-focus images are obtained through conversion of the plurality of first all-in-focus images obtained by the image acquisition unit so that the images become closer to a plurality of reference all-in-focus images. The plurality of reference all-in-focus images are obtained when the plurality of measurement visual field area are captured in a brightness setting serving as a reference.

10 Claims, 22 Drawing Sheets

(56) References Cited

U.S. PATENT DOCUMENTS

| | | | | |
|---|---|---|---|---|
| 2013/0050464 A1* | 2/2013 | Kang | ................... | G02B 21/26 |
| | | | | 348/79 |
| 2015/0253557 A1* | 9/2015 | Kalkbrenner | ...... | G02B 21/0032 |
| | | | | 250/208.1 |
| 2017/0235119 A1* | 8/2017 | Fujii | ................. | G02B 21/0032 |
| | | | | 348/79 |
| 2018/0164563 A1* | 6/2018 | Fujii | ....................... | G01B 9/04 |

* cited by examiner

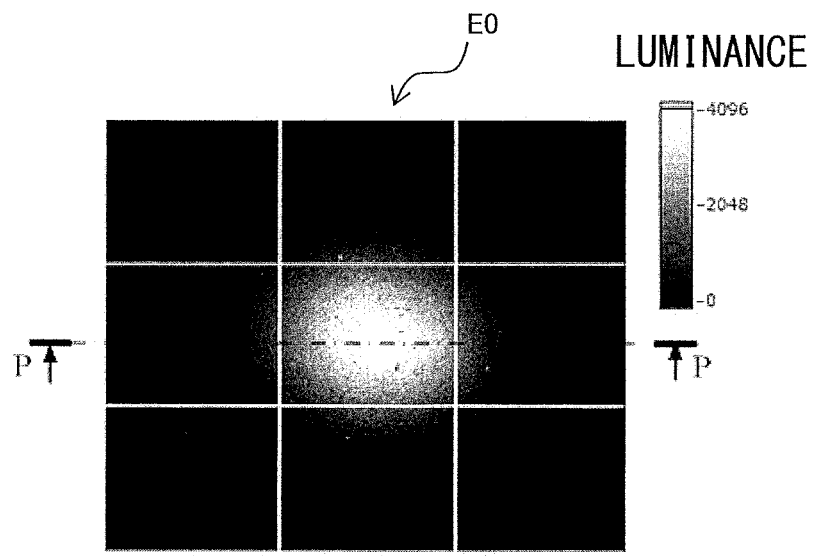
F I G. 1 A
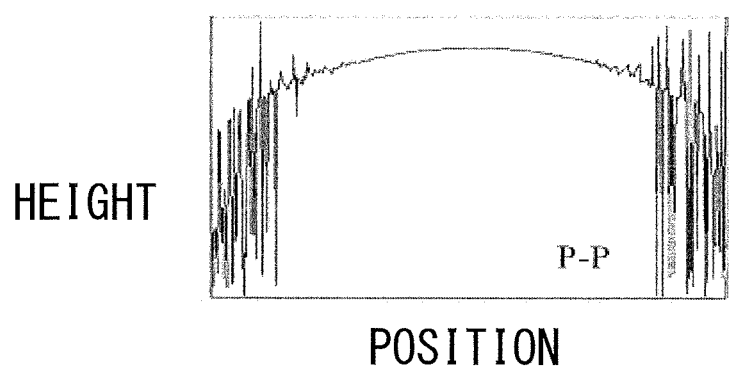
F I G. 1 B

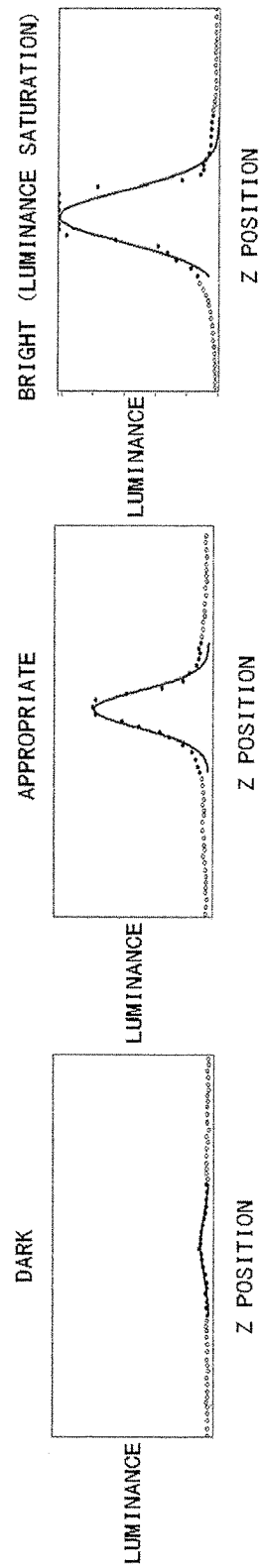

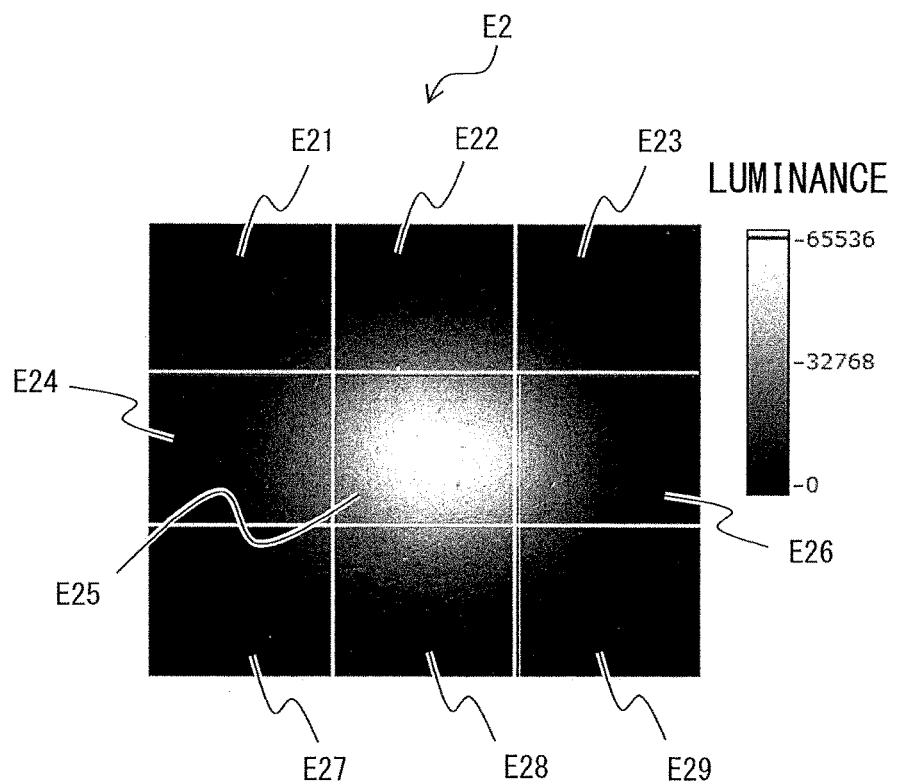
F I G. 11

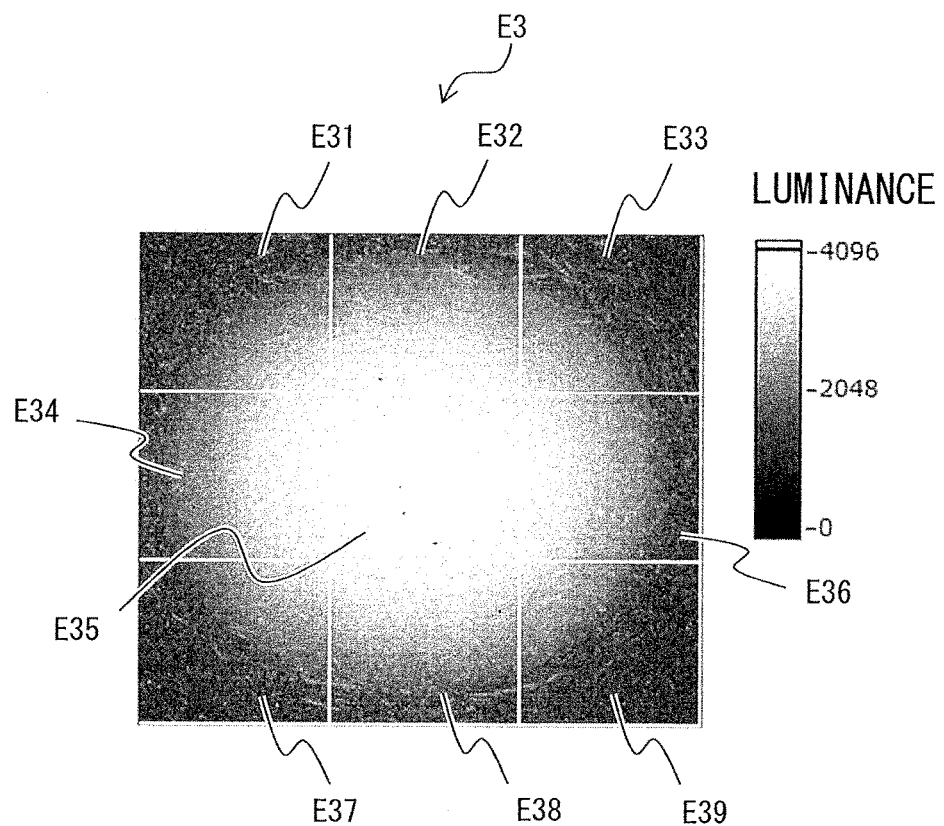
F I G. 1 3

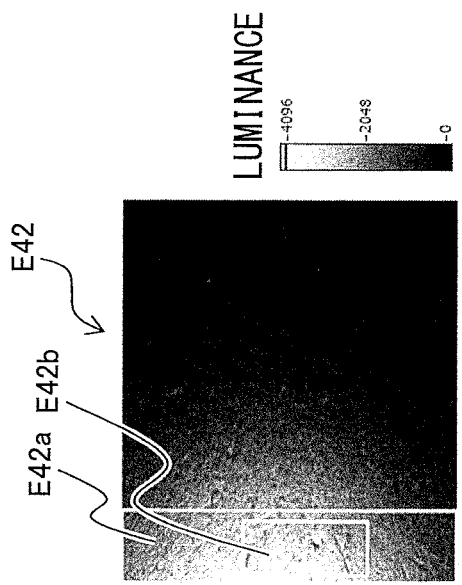
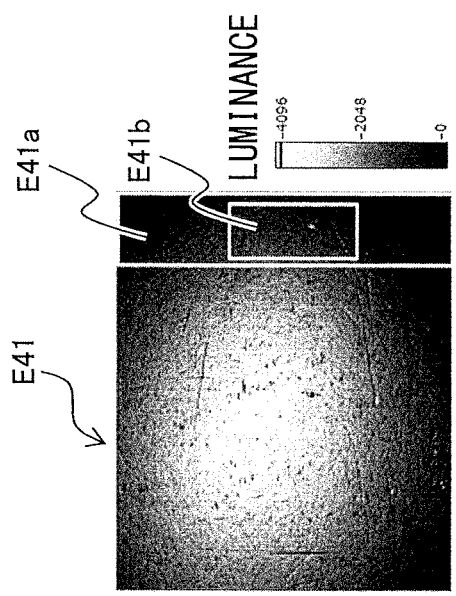
FIG. 15B
FIG. 15A

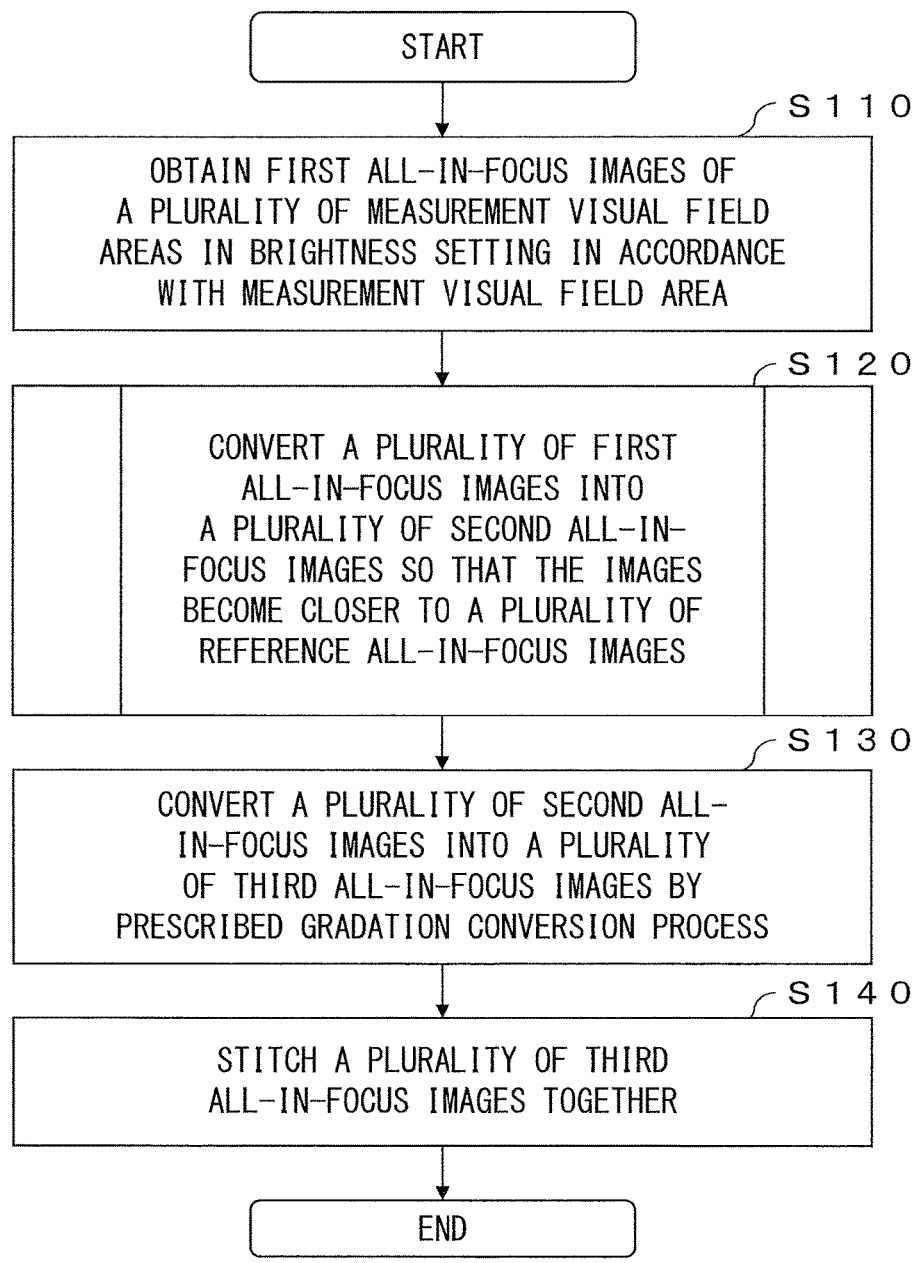
F I G. 1 8

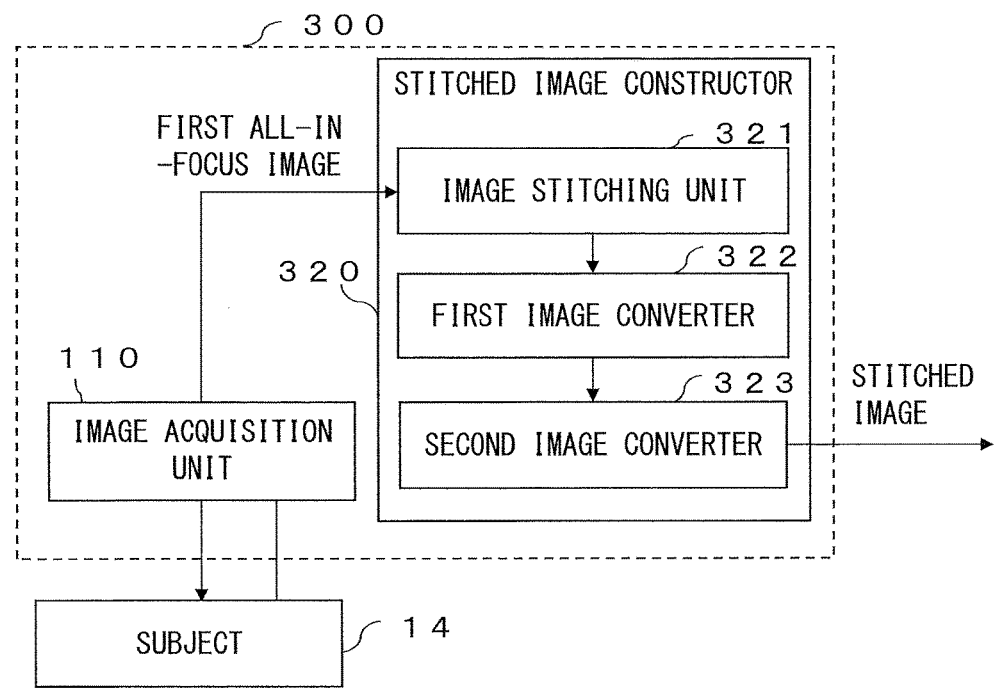
F I G. 19

CONFOCAL MICROSCOPE APPARATUS, STITCHED IMAGE CONSTRUCTION METHOD AND COMPUTER-READABLE MEDIUM

CROSS REFERENCE TO RELATED APPLICATIONS

This application is based upon and claims the benefit of priority from prior Japanese Patent Application No. 2016-028265, filed Feb. 17, 2016, the entire contents of which are incorporated herein by this reference.

BACKGROUND OF THE INVENTION

Field of the Invention

The present invention is related to a confocal microscope apparatus, a stitched image construction method and a computer-readable medium.

Description of the Related Art

Confocal microscope apparatuses have conventionally been known as apparatuses that measure the three-dimensional shape of an object in a contactless manner. Among such confocal microscope apparatuses, laser scanning confocal microscope apparatuses, which use a laser as the light source, such as one described in Japanese Patent No. 3847422 for example are currently known and adopted widely in industry.

A laser scanning confocal microscope apparatus irradiates the subject with a laser beam that is condensed by the objective into a spot, and thereby scans the subject in the two-dimensional directions (XY plane directions). Then, the light reflected from the subject is received by a detector via a confocal diaphragm. Because the opening of a confocal diaphragm is formed at a position that is optically conjugate with the focal position of the objective, only light reflected from a portion in focus passes through the confocal diaphragm so as to be received by the detector. This makes it possible for a laser scanning confocal microscope apparatus which has a focal depth that is shallower than that of normal optical microscopes to obtain a luminance image in which only a focal portion has been imaged. This type of image is generally referred to as a confocal image. Hereinafter, an image obtained by a device having a shallow focal depth is referred to as an image with a shallow focal depth.

When the surface shape of a subject is measured by using a laser scanning confocal microscope apparatus, the shallowness of a focal depth is utilized. Specifically, a plurality of confocal images with shallow focal depths are obtained while changing the relative distance between the objective and the subject in the optical axial directions (Z directions). Then, by obtaining the Z position (i.e., focal position) that results in the maximum luminance at each pixel position from a plurality of confocal images, the surface shape of the entire surface of the subject is measured. Also, by treating the maximum luminance value at each pixel position identified from a plurality of confocal images as a new luminance value of each pixel so as to construct a new image, an image in which all spots on the subject surface are in focus can be obtained. This image is referred to as an all-in-focus image or an extended-focus image. The image data of an all-in-focus image is used together with measurement data of a surface shape in various occasions. Note that the measurement data of a surface shape is also referred to as height measurement data.

As a general rule, in order to perform accurate measurement in the Z directions by using a confocal microscope apparatus, it is desirable that the measurement be performed in a setting with a shallow focal depth, i.e., in a setting with a high magnification for the objective. However, a high magnification reduces an area that can be measured at a time (which will be referred to as a measurement visual field area). Because of this, image stitching techniques are used for measuring a wide area with high accuracy in the Z directions. Note that, instead of the term "stitching", terms such as "jointing", "tying", etc. are also used to represent similar meanings.

As an example of a measurement method using an image stitching technique, the method of Japanese Laid-open Patent Publication No. 2004-170572 is known. In this method, measurement is performed while moving a stage in the X and Y directions at an appropriate pitch so that part of a measurement visual field area overlaps part of another measurement visual field area that is adjacent to the measurement visual field area. Then, by jointing a plurality of images corresponding to the plurality of measurement visual field areas obtained in the measurement, a stitched image of an area wider than that of each of the measurement visual field areas is constructed, and thereby the height data of that wider area is obtained. This method makes it possible to measure an area in a desired size even when the microscope apparatus has a high observation magnification. Hereinafter, the entire area that is to be measured will be referred to as a measurement target area.

SUMMARY OF THE INVENTION

An aspect of the present invention provides a confocal microscope apparatus including an image acquisition unit configured to obtain a first all-in-focus image of each of a plurality of measurement visual field areas constituting a measurement target area, which is a target of a measurement, in a brightness setting in accordance with the corresponding measurement visual field area, and a stitched image constructor configured to construct a stitched image on the basis of a plurality of second all-in-focus images obtained through conversion of the plurality of first all-in-focus images obtained by the image acquisition unit so that the images become closer to a plurality of reference all-in-focus images obtained when the plurality of measurement visual field area are captured in a brightness setting serving as a reference.

Another aspect of the present invention provides a stitched image construction method including obtaining a first all-in-focus image of each of a plurality of measurement visual field areas constituting a measurement target area, which is a target of a measurement, in a brightness setting in accordance with the corresponding measurement visual field area, and constructing a stitched image on the basis of a plurality of second all-in-focus images obtained through conversion of the plurality of first all-in-focus images so that the images become closer to a plurality of reference all-in-focus images obtained when the plurality of measurement visual field area are captured in a brightness setting serving as a reference.

Still another aspect of the present invention is A non-transitory computer-readable medium having stored therein a program for causing a computer to execute a process including obtaining a first all-in-focus image of each of a plurality of measurement visual field areas constituting a measurement target area, which is a target of a measurement, in a brightness setting in accordance with the corresponding measurement visual field area, and constructing a stitched image on the basis of a plurality of second all-in-focus images obtained through conversion of the plurality of first all-in-focus images so that the images become closer to a plurality of reference all-in-focus images obtained when the plurality of measurement visual field area are captured in a brightness setting serving as a reference.

BRIEF DESCRIPTION OF THE DRAWINGS

The present invention will be more apparent from the following detailed description when the accompanying drawings are referenced.

FIG. 1A exemplifies stitched image E0 of a rigid sphere used for a ball bearing, which is the subject;

FIG. 1B exemplifies a height measurement result of the rigid sphere;

FIG. 7A through FIG. 7C show relationships between brightness settings and a luminance change curve;

FIG. 11 exemplifies stitched image E2 constructed by stitching a plurality of second all-in-focus images together;

FIG. 13 exemplifies stitched image E3 constructed by stitching a plurality of third all-in-focus images together;

FIG. 15A and FIG. 15B exemplify two adjacent first all-in-focus images;

FIG. 18 is a flowchart of a process performed by the confocal microscope apparatus 200;

FIG. 19 is a functional block diagram of a confocal microscope apparatus 300 according to a third embodiment;

DESCRIPTION OF THE EMBODIMENTS

In order to obtain a stitched image having natural joints between luminance images such as all-in-focus images and causing no sense of strangeness, it is desirable that all luminance images constituting the stitched image be obtained in the same brightness setting. However, when a stitching target area (i.e., measurement target area) has a portion with a large tilting angle or a portion with a low reflectance in a case when all luminance images are obtained in the same brightness setting, the detection amount of light reflected from such portions becomes insufficient. This causes the height measurement data of such portions to involve many noise components, reducing the reliability of the height measurement data. FIG. 1A and FIG. 1B show specific examples of this phenomenon.

FIG. 1A and FIG. 1B exemplify stitched image E0 of a rigid sphere used for a ball bearing, which is the subject, and the height measurement result of the rigid sphere. FIG. 1A shows stitched image E0, which is obtained by stitching all-in-focus images of nine (3 rows×3 columns) measurement visual field areas including the rigid sphere. Also, FIG. 1B shows the height measurement results on section P-P of stitched image E0. Note that the lines forming the grates on stitched image E0 shown in FIG. 1A are provided for the sake of convenience in order to represent the positions of the measurement visual field areas.

Constructed from a plurality of images obtained in the same brightness setting, stitched image E0 shown in FIG. 1A is an image having natural joints between images and bringing no sense of strangeness. Further, as for the portion around the center of the stitching target area where the surface apex of the rigid sphere is located, an image with sufficient brightness as shown in FIG. 1A is obtained. Also, the height has also been measured correctly as shown in FIG. 1B. However, as for the edge portions of the stitching target areas, images with sufficient brightness have not been obtained because the tilt angles of the surface of the right sphere are large. Also, the height measurement data involves many noise components, reducing the reliability of the measurement result.

In order to avoid the phenomenon as shown in FIG. 1A and FIG. 1B, a countermeasure may be conceivable by which images are obtained in a brightness setting that results in a appropriate amount of detected light reflected from a portion with a large tilting angle or a portion with a low reflectance. However, the luminance of the image saturates in the portion with a small tilting angle or the portion with a high reflectance in such a case. Also, the saturation of the luminance of an image reduces the reliability of the height measurement data.

In view of the above, specific explanations will be given for the embodiments of the present invention.

First Embodiment

Figure 2:
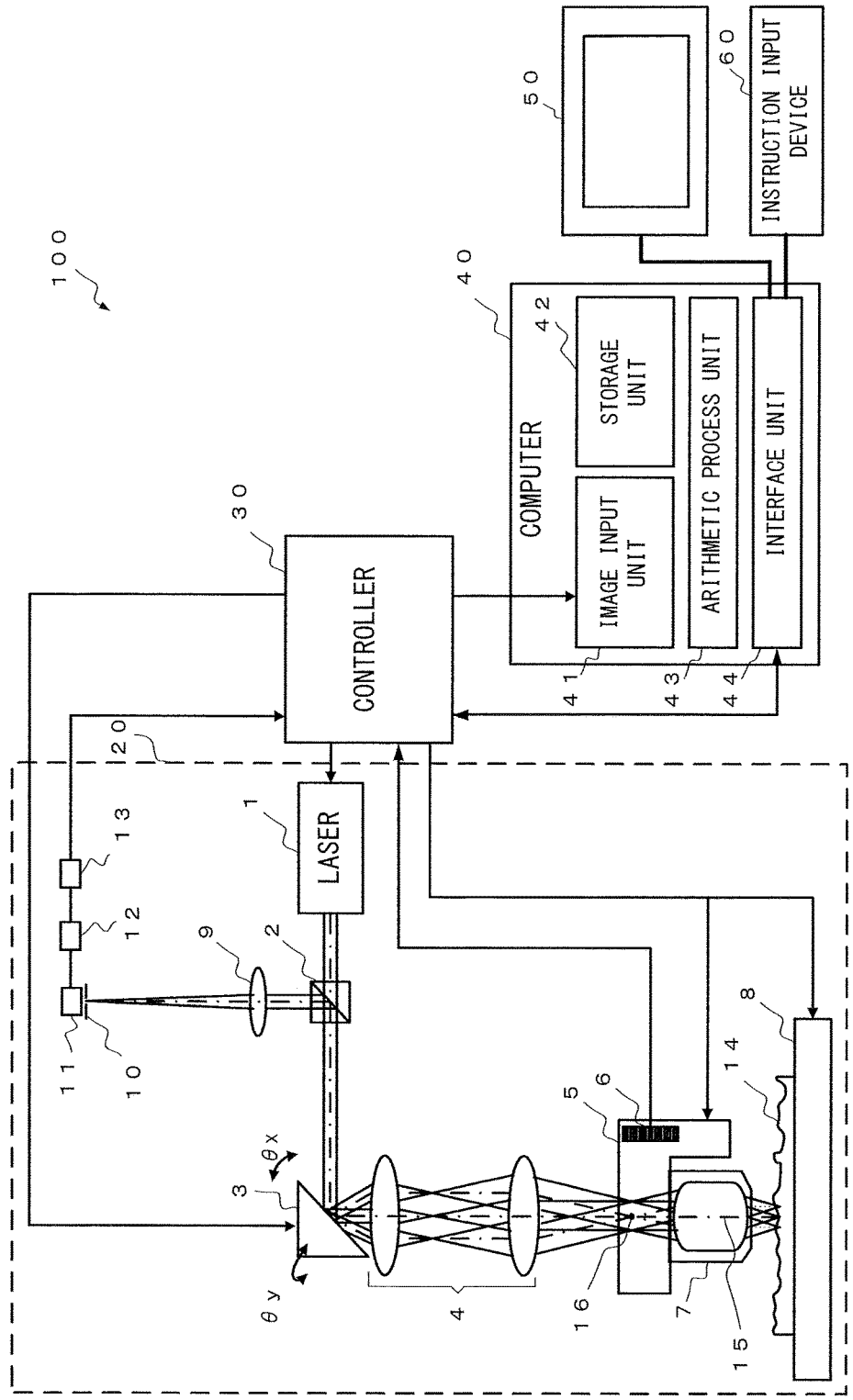
FIG. 2 exemplifies a configuration of a confocal microscope apparatus 100 according to a first embodiment.

FIG. 2 exemplifies a configuration of a confocal microscope apparatus 100 according to the present embodiment. The confocal microscope apparatus 100 is an apparatus that measures the three-dimensional shape of a subject 14 in a contactless manner. The confocal microscope apparatus 100 can measure the height of an area that is greater than the visual field by using a image stitching technique. Examples of the subject 14 include a semiconductor substrate etc. First, explanations will be given for a configuration of confocal microscope apparatus 100 by referring to FIG. 2.

The confocal microscope apparatus 100 is a laser scanning confocal microscope apparatus including a laser 1. The confocal microscope apparatus 100 as shown in FIG. 2 includes a confocal microscope body 20, a controller 30 that controls the confocal microscope body 20, a computer 40 connected to the controller 30, and a display device 50 and an instruction input device 60 that are connected to the computer 40.

The confocal microscope body 20 includes, on the illumination optical path through which a laser beam emitted from the laser 1 travels to reach the subject 14, a beam splitter 2, a two-dimensional deflector 3, a projector lens 4, a Z scanner 5, an objective 7 and a stage 8 on which the subject 14 is mounted.

The laser 1 is a light source that emits a laser beam as parallel light. The amount of laser beams emitted from the laser 1 is controlled on the basis of an input from the controller 30. Specifically, by for example the controller 30 changing the drive current of the laser 1, the emission light amount from the laser 1 changes.

Examples of the beam splitter 2 include a polarization beam splitter, a half mirror, etc. When the subject 14 is a biological sample etc., it may be a dichroic mirror. The beam splitter 2 transmits a laser beam from the laser 1 and reflects a beam reflected by the subject 14.

The two-dimensional deflector 3 is a device that deflects a laser beam from the laser 1 in a desired direction. The two-dimensional deflector 3 is a scanner that uses a laser beam to scan the subject 14 in the two-dimensional directions that are orthogonal to an optical axis 15 of the objective 7. Examples of the two-dimensional deflector 3 are a galvano mirror, a resonant scanner, an acousto-optical element, etc, and are arranged in optically conjugate position with the pupil of the objective 7 or in the vicinity thereof. The two-dimensional deflector 3 is configured to deflect a laser beam in the X direction and Y direction independently. On the basis of an instruction of a deflection timing from the controller 30, the two-dimensional deflector 3 changes deflection angle $\theta_x$ for the X direction of a laser beam and changes deflection angle $\theta_y$ for the Y direction of the laser beam. Note that FIG. 2 shows a plurality of light fluxes having different deflection angles $\theta_x$.

The projector lens 4 is a lens that projects the pupil of the objective 7 onto the two-dimensional deflector 3 or onto the vicinity thereof. The projector lens 4 is arranged so that the focal position on the object side of the projector lens 4 is in the vicinity of a back-side focal position 16 of the objective 7. The projector lens 4 enlarges the diameter of a laser beam, which is parallel light emitted from the laser 1, so as to make the light enter the objective 7.

The Z scanner 5 is a device that changes a relative distance between the objective 7 and the stage 8. The Z scanner 5 is a scanner that scans the subject 14 in the directions along the optical axis 15 of the objective 7 (which will be referred to as the optical axis directions or Z directions). The Z scanner 5 is configured to move in the Z directions. The Z scanner 5 is provided with a displacement meter 6 that measures a displacement amount caused by movements of the Z scanner 5 in the Z directions, i.e., a change amount in a relative distance between the objective 7 and the stage 8. The displacement meter 6 is for example an optical linear encoder. Also, it may be a capacitance displacement meter or other types of displacement meter. The displacement amount measured by the displacement meter 6 is output to the controller 30.

The objective 7 is provided to the Z scanner 5 and is moved in the Z directions by the Z scanner 5 moving in the Z directions. The subject 14 is arranged in the vicinity of the front-side focal position of the objective 7 on the stage 8. The stage 8 is a movable stage that moves in the X and Y directions, which are orthogonal to the optical axis 15 of the objective 7. The stage 8 may be an electrically-driven stage or may be a manually-driven stage.

The confocal microscope body 20 further includes, on the detection optical path through which a laser beam reflected by the subject 14 travels to reach an optical detector 11, the objective 7, the Z scanner 5, the projector lens 4, the two-dimensional deflector 3, the beam splitter 2, an imaging lens 9, a confocal diaphragm 10, and an optical detector 11.

The imaging lens 9, the confocal diaphragm 10 and the optical detector 11 are provided on the reflected optical path, through which a laser beam reflected by the beam splitter 2 travels. The confocal diaphragm 10 is arranged so that the pinhole provided to the confocal diaphragm 10 is positioned at the focal position of the imaging lens 9. The optical detector 11 arranged in a stage later than the confocal diaphragm 10 is for example a photomultiplier (PMT), an avalanche photo diode (APD), etc.

The confocal microscope body 20 further includes an amplifier 12 that amplifies an analog signal output from the optical detector 11 and the AD converter 13 that converts an analog signal amplified by the amplifier 12 into a digital signal.

The amplification factor in the amplifier 12 is determined by an input from the controller 30. Specifically, it is determined by for example a voltage applied to the amplifier 12. Also, an example is shown herein where an amplification factor of an analog signal output from the optical detector 11 is changed by the amplifier 12 that is independent from the optical detector 11. However, an amplification factor of an analog signal may be changed by changing the amplification factor in the optical detector 11, i.e., an amplification factor of an analog signal output from the optical detector 11. For example, the controller 30 may change an amplification factor by changing a voltage applied to a photomultiplier or an avalanche photo diode serving as the optical detector 11. The AD converter 13 converts an analog signal amplified by the amplifier 12 into a digital signal of for example 12 bits or 16 bits, and outputs the signal to the controller 30.

The confocal microscope body 20 having the above configuration scans the subject 14 under control of the controller 30 so as to output, to the controller 30, a signal in accordance with the reflected light amount from the subject 14 detected by the optical detector 11 and the displacement amount measured by the displacement meter 6.

The controller 30 generates image data of a confocal image on the basis of a signal from the confocal microscope body 20 so as to output it to the computer 40. Also, the displacement amount measured by the displacement meter 6 is output to the computer 40. Further, in accordance with an instruction input by the microscope user to the computer 40 by using the instruction input device 60, the controller 30 controls the confocal microscope body 20. For example, the controller 30 controls the two-dimensional deflector 3 and the Z scanner 5 in order to scan the subject 14. Also, the controller 30 controls the laser 1, the optical detector 11 and the amplifier 12 in order to change a setting related to the brightness (which will be referred to as a brightness setting hereinafter) of a confocal image of the subject 14 obtained by the confocal microscope apparatus 100.

It is desirable that a brightness setting include at least one of a setting related to the emission light amount of the laser 1 and a setting related to an amplification factor at which a signal that will be output or that was output from the optical detector 11 is amplified. More specifically, it is desirable that at least one of a setting related to a drive current of the laser 1 and a setting related to a voltage applied to a photomultiplier or an avalanche photo diode serving as the optical detector 11 be included.

The computer 40 includes an image input unit 41, a storage unit 42, an arithmetic process unit 43 and an interface unit 44. The image input unit 41 receives input of image data of a confocal image from the controller 30. Examples of the storage unit 42 are a hard disk device, a semiconductor memory, etc. The storage unit 42 includes image data such as a confocal image, an all-in-focus image, etc., and other types of data. The arithmetic process unit 43 is for example a central processing unit (CPU), and executes a program stored in the storage unit 42 so as to perform various types of arithmetic operations. The arithmetic process unit 43 measures the three-dimensional shape (surface height) of the subject 14 and constructs a stitched image on the basis of for example image data of a confocal image and the Z-directional displacement amount input from the controller 30. The interface unit 44 exchanges necessary data between the computer 40 and other devices.

The display device 50 is a device that displays a stitched image, which will be described later, and a measurement result. Examples of the display device 50 are a liquid crystal display, an organic EL (Electro-Luminescence) display, a CRT (Cathode Ray Tub) display, etc. The instruction input device 60 is a device used by the microscope user for inputting an instruction to the computer 40, and is for example a keyboard, a mouse, etc. The display device 50 and the instruction input device 60 may be integrated into the computer 40 or may be part of the computer 40.

Next, explanations will be given for a method of obtaining image data of a confocal image in the confocal microscope apparatus 100. A laser beam emitted from the laser 1 is transmitted through the beam splitter 2 and enters the projector lens 4 via the two-dimensional deflector 3. A laser beam, which is parallel light that has entered the projector lens 4, has its light flux diameter enlarged by the projector lens 4, and enters the objective 7. Thereafter, the laser beam is condensed into a spot on the front-side focal plane of the objective 7 by the refractive power of the objective 7, and the subject 14 arranged in the vicinity of the front-side focal position of the objective 7 is irradiated with it.

The condensing position of the laser beam on the front-side focal plane is determined by a direction in which the laser beam was deflected by the two-dimensional deflector 3. Accordingly, by controlling deflection angles $\theta_x$ and $\theta_y$ of a laser beam in the two-dimensional deflector 3, the condensing position of the laser beam changes in the X and Y directions on the focal plane. In the confocal microscope apparatus 100, the controller 30 controls the two-dimensional deflector 3 so that for example raster scan is conducted. Thereby, the subject 14 is scanned two dimensionally.

A laser beam reflected from the subject 14 enters the two-dimensional deflector 3 via the objective 7 and the projector lens 4. A laser beam deflected by the two-dimensional deflector 3 toward the beam splitter 2 is reflected by the beam splitter 2 and enters the confocal diaphragm 10 via the imaging lens 9. Then, only a laser beam that has passed through the pinhole provided to the confocal diaphragm 10 is detected by the optical detector 11.

The optical detector 11 outputs, to the amplifier 12, an analog signal in accordance with the amount of the detected laser beam. The AD converter 13 converts an analog signal amplified by the amplifier 12 into a digital signal so as to output it to the controller 30. Note that a digital signal input to the controller 30 from the AD converter 13 represents a luminance value corresponding to the condensing position of the current laser beam.

In the confocal microscope apparatus 100, the controller 30 obtains a luminance value for each condensing position that has changed by the controller 30 controlling the two-dimensional deflector 3, and conducts two-dimensional mapping on the obtained luminance value so as to obtain a confocal image. Specifically, by setting a luminance value obtained for each condensing position as a pixel value of a pixel corresponding to that condensing position, the controller 30 generates image data of a confocal image. Image data of a confocal image generated by the controller 30 is output to the image input unit 41 of the computer 40 and is thereafter displayed by the display device 50.

Figure 3:
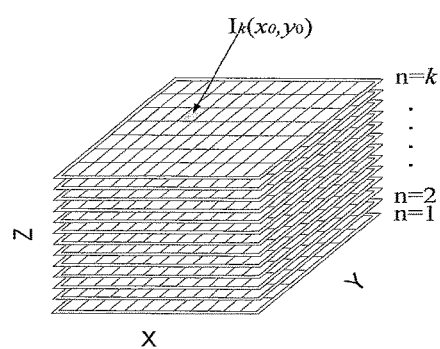
FIG. 3 exemplifies image data of a plurality of confocal images obtained by the confocal microscope apparatus 100.
Figure 4:
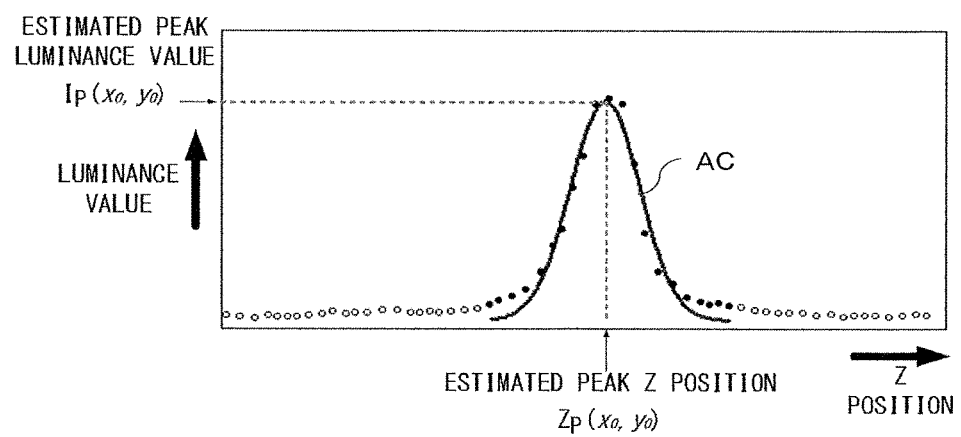
FIG. 4 exemplifies a luminance change curve generated by the confocal microscope apparatus 100.

Next, by referring to FIG. 3 and FIG. 4, explanations will be given for a method of measuring a height and a method of obtaining an all-in-focus image in the confocal microscope apparatus 100. FIG. 3 exemplifies image data of a plurality of confocal images obtained by the confocal microscope apparatus 100. FIG. 4 exemplifies a luminance change curve generated by the confocal microscope apparatus 100.

The controller 30 performs Z scan of changing a relative distance between the objective 7 and the stage 8 by using the Z scanner 5 so as to obtain a confocal image at each Z position. Thereby, a plurality of confocal images are obtained at different Z positions, and image data of those plurality of confocal images is stored in the storage unit 42. FIG. 3 exemplifies image data of k confocal images stored in the storage unit 42. Note that each confocal image is given an image number ranging from 1 through k (k is a natural number). The luminance value of each pixel of a confocal image with image number n is represented by luminance value $I_n$ (x, y). In this example, x, y represent the positions in the X and Y directions (X position and Y position) of a target pixel.

Changing a relative distance results in a change in the reflected light amount (i.e., luminance) from a point on the subject 14 detected by the optical detector 11. The trace of this change in luminance has a roughly consistent shape depending upon the numerical aperture of the objective 7, the wavelength of a laser beam, and the size of the opening (pinhole) of the confocal diaphragm 10. Hereinafter, the trace of this change in luminance will be referred to as a luminance change curve. The arithmetic process unit 43 estimates a luminance change curve for each XY position on the basis of image data of a plurality of confocal images obtained at different Z positions.

By referring to FIG. 4, explanations will be given for a case where the luminance change curve at a given point (x0, y0) is estimated. First, the luminance value of the pixel at position (x0, y0) is obtained from each of the obtained k confocal images. Then, these luminance values are plotted in the I-Z space, where the vertical axis represents luminance values (I) and the horizontal axis represents z positions (Z). The black circles in FIG. 4 represent the plotted points. Note that the Z positions of these points are determined by a displacement amount received from the displacement meter 6 upon obtaining a confocal image. Thereafter, several tens of points are extracted from the point representing the highest luminance value among those plotted and the points plotted in the vicinity of the point representing the highest luminance value. Further, approximate curve AC is calculated by using the data of extracted points (luminance values and Z positions) so as to estimate calculated approximate curve AC as a luminance change curve. Note that in the calculation of an approximate curve, a quadratic polynomial, a higher dimension polynomial, or a gaussian curve is used as a curve as an approximation target, for example. Also, a least-square method may be a representative method for approximation.

The arithmetic process unit 43 further estimates the peak luminance value that is the maximum luminance value and the Z position (which will be referred to as a peak Z position) that results in the maximum luminance value from the estimated luminance change curve. This process is also performed for each XY position similarly to the estimation process of a luminance change curve. As a result of this, peak Z position distribution Zp (x, y) representing a set of peak Z positions at all XY positions and peak luminance value distribution Ip (x, y) representing a set of peak luminance values at all XY positions are calculated.

In the confocal microscope apparatus 100, when the surface of the subject 14 is at the condensing position of a laser beam (in other words, when the position of the surface of the subject 14 is at the focal position), the luminance value becomes maximum. Therefore, peak Z position distribution Zp (x, y) represents the height distribution of the surface of the subject 14 (i.e., surface shape). This makes it possible to measure the height of the subject 14 by using the above method of calculating peak Z position distribution Zp (x, y). Hereinafter, peak Z position distribution Zp (x, y) will be referred to as height data or height measurement data.

Also, peak luminance value distribution Ip (x, y) calculated together with peak Z position distribution Zp (x, y) is a set of luminance values at a peak Z position, which is a focal position. Accordingly, peak luminance value distribution Ip (x, y) is image data itself of all-in-focus image in which all positions on the surface of the subject 14 are in focus. This makes it possible to generate image data of an all-in-focus image by obtaining the all-in-focus image by using the above method of calculating peak luminance value distribution Ip (x, y).

Next, explanations will be given for a method by which a highly reliable height measurement and construction of stitched image having natural joints and causing no sense of strangeness are both realized, by exemplifying a case where the subject 14 is a rigid sphere for ball bearing that is in total nine (3 rows×3 columns) measurement visual field areas.

Figure 5:
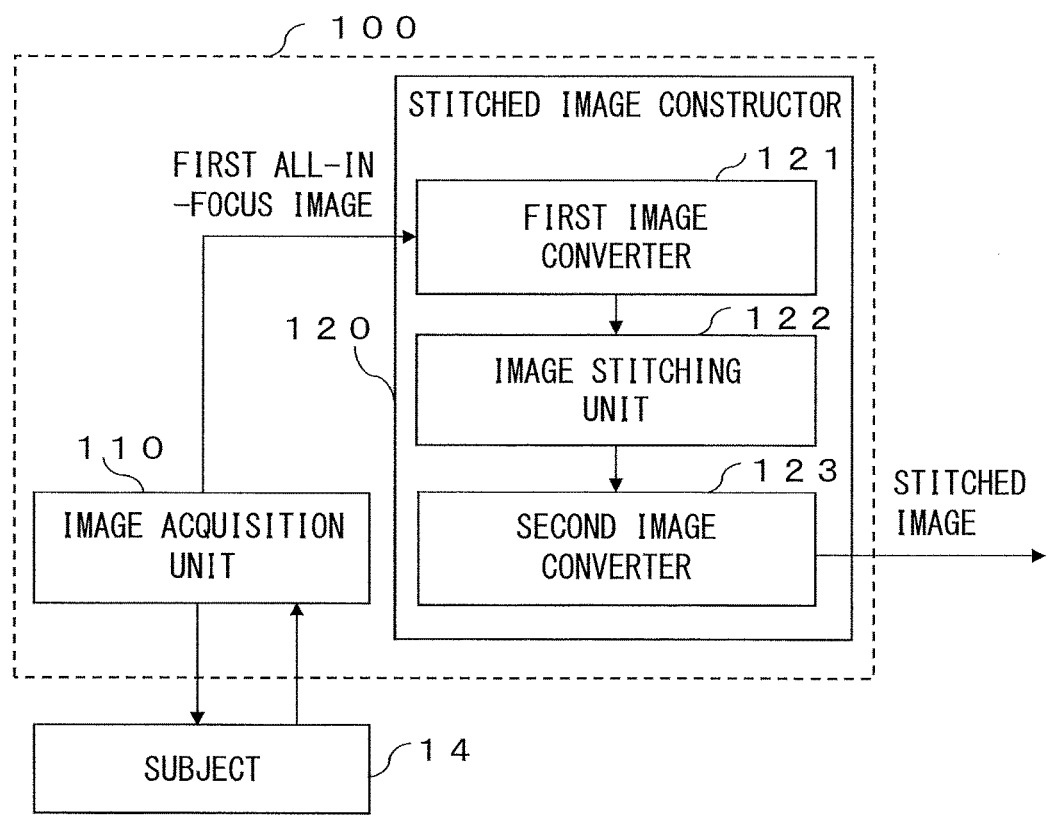
FIG. 5 is a functional block diagram of the confocal microscope apparatus 100.

FIG. 5 is a functional block diagram of the confocal microscope apparatus 100. The confocal microscope apparatus 100 includes an image acquisition unit 110 and a stitched image constructor 120 as shown in FIG. 5 in order to realize both a highly reliable height measurement and construction of stitched image with natural joints and causing no sense of strangeness. Also, the stitched image constructor 120 includes a first image converter 121, an image stitching unit 122 and a second image converter 123. Note that the image acquisition unit 110 may include for example the image input unit 41 of the computer 40 shown in FIG. 2 or may include the confocal microscope body 20 and the controller 30. Also, the image acquisition unit 110 may include the image input unit 41, the confocal microscope body 20 and the controller 30. The stitched image constructor 120 includes for example an arithmetic process unit 43 of the computer 40 shown in FIG. 2.

Figure 6:
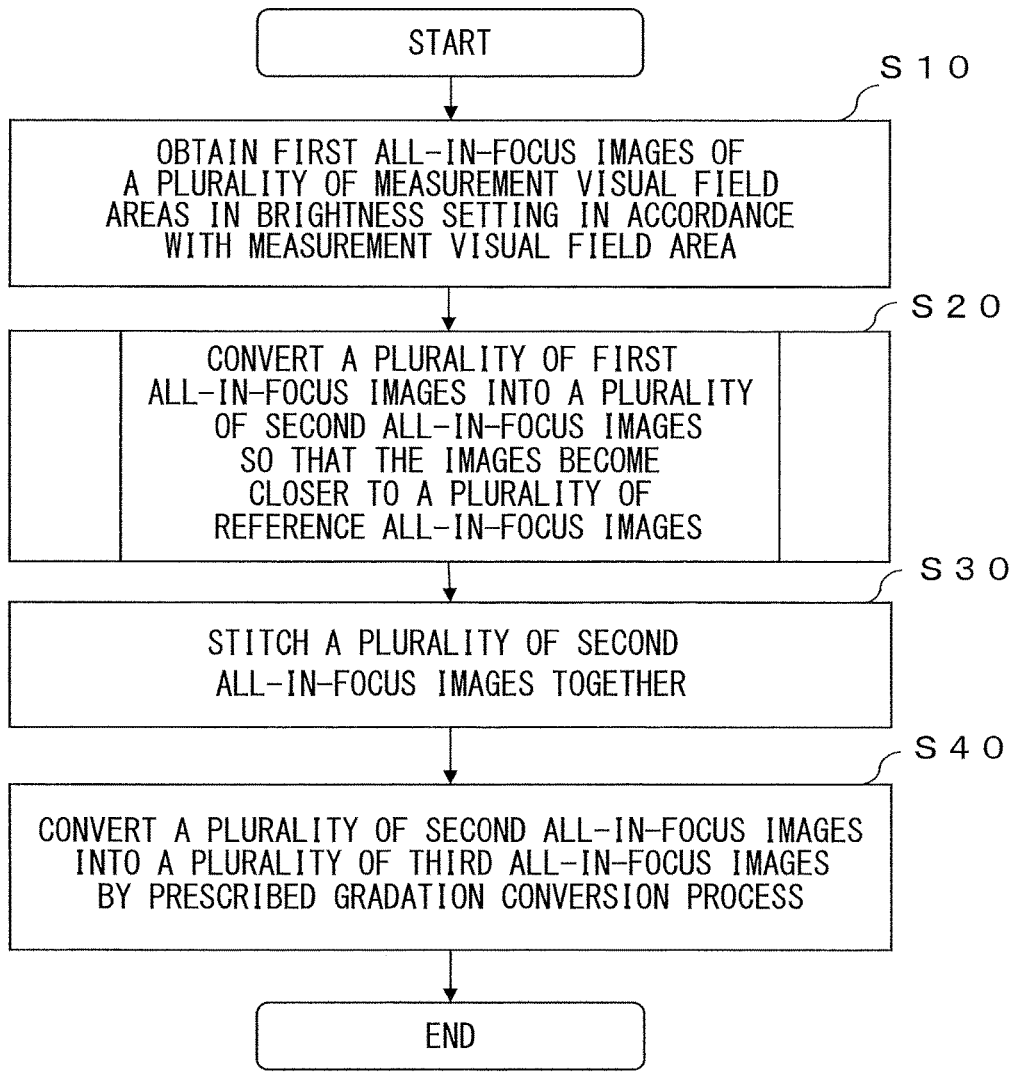
FIG. 6 is a flowchart of a process performed by the confocal microscope apparatus 100.

FIG. 6 is a flowchart of a process performed by the confocal microscope apparatus 100. In the confocal microscope apparatus 100, when the height measurement and construction of a stitched image are started, the image acquisition unit 110 first obtains the all-in-focus image of each of a plurality of measurement visual field areas constituting the measurement target area in a brightness setting in accordance with each measurement visual field area. Thereby, the image data and the height measurement data of an all-in-focus image are generated for each measurement visual field area.

It is sufficient if a plurality of measurement visual field area are areas that account for the measurement target area with their entirety, and it is desirable that each of the plurality of measurement visual field areas partially overlap its adjacent measurement visual field area.

In step S10, the image acquisition unit 110 first moves the subject 14 in the XY directions by the stage 8 so as to adjust the visual field of the confocal microscope apparatus 100 to the plurality of measurement visual field areas sequentially. Then, all-in-focus images of the plurality of measurement visual field areas are obtained sequentially. In the obtainment, the image acquisition unit 110 obtains the all-in-focus images in a brightness setting in accordance with the measurement visual field areas that are in the visual field. Hereinafter, an all-in-focus image obtained by the image acquisition unit 110 will be referred to as a first all-in-focus image. As described above, when a first all-in-focus image is obtained, height measurement data is generated together with the first all-in-focus image data.

FIG. 7A through FIG. 7C show relationships between brightness settings and a luminance change curve. A brightness setting in accordance with a measurement visual field area is such a setting that the portion with the largest amount of reflected light in the measurement visual field area has an appropriate brightness. In more detail, it is a brightness setting in which the luminance change curve at the XY position with the largest amount of reflected light does not have too low a peak as shown in FIG. 7A and the curve is not too high so as not to have the luminance value in a saturated state as shown in FIG. 7C. It is desirable that the setting be a setting in which the peak value of the luminance change curve at the XY position with the largest amount of reflected light as shown in FIG. 7B is around 70% through 90% of the saturation luminance value.

The brightness setting in accordance with a measurement visual field area is stored in advance in the storage unit 42 as for example a drive current value for the laser 1 or a voltage applied to the optical detector 11 or the amplifier 12. This brightness setting is stored in the storage unit 42 by the user of the confocal microscope apparatus 100 repeatedly specifying the brightness setting by using the instruction input device 60 for each measurement visual field area and confirming the brightness of an all-in-focus image displayed in the display device 50 so as to identify an appropriate brightness setting in advance.

In the present embodiment, an example is shown in which the value of a voltage applied to the amplifier 12 is stored in the storage unit 42 for each measurement visual field area. The image acquisition unit 110 changes the value of a voltage applied to the amplifier 12 in accordance with a measurement visual field area and changes the amplification factor of the amplifier 12 so as to change the brightness setting.

Figure 8A:
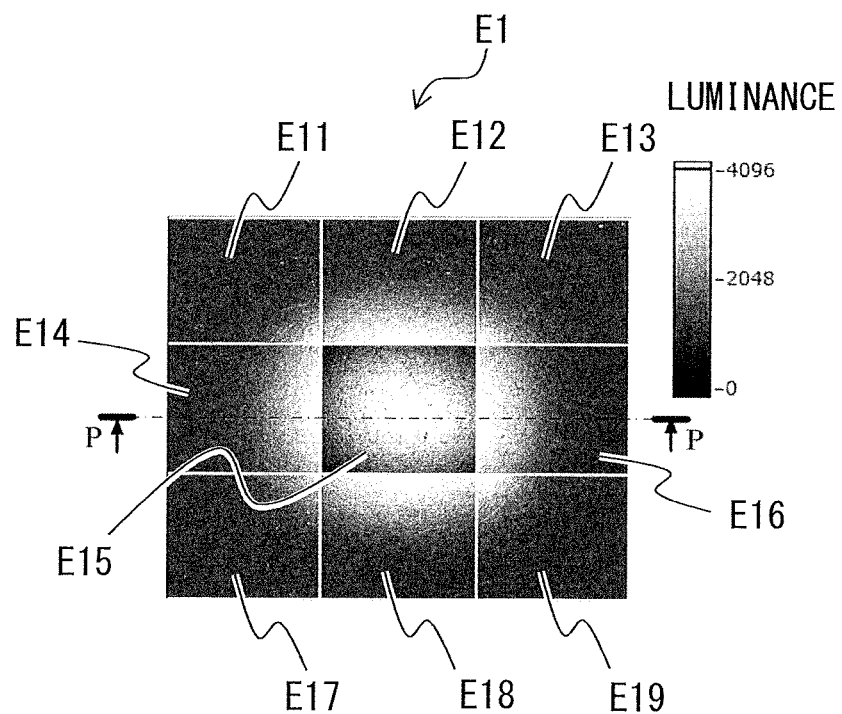
FIG. 8A exemplifies image E1 obtained by stitching a plurality of first all-in-focus images.
Figure 8B:
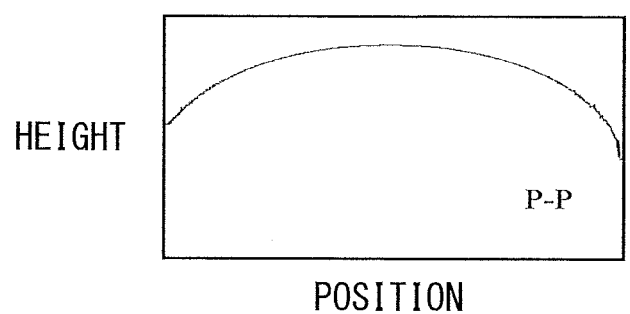
FIG. 8B exemplifies a height measurement result.

FIG. 8A and FIG. 8B exemplify image E1 obtained by stitching the plurality of first all-in-focus images obtained by the image acquisition unit 110 and the measurement result. First all-in-focus images E11 through E19 shown in FIG. 8A are 12-bit digital images and the number of the luminance gradation of each image is 4096. Also, all-in-focus image E15, located at the center, is an image obtained in the lowest brightness setting (amplification factor A). First all-in-focus images E12, E14, E16 and E18 are images obtained in an intermediate brightness setting (amplification factor B). First all-in-focus images E11, E13, E17 and E19 are images obtained in a highest brightness setting (amplification factor C). In this example, amplification factor A<amplification factor B<amplification factor C is satisfied.

First all-in-focus images E11 through E19 shown in FIG. 8A are obtained in appropriate brightness settings, resulting in a lower ratio of noise components included in the images. This makes it possible to obtain a highly reliable measurement result that correctly represents the shape of the rigid sphere over the entire measurement target area in step S10 as shown in FIG. 8B. Meanwhile, stitching first all-in-focus images E11 through 519 that are in different brightness settings as they as shown in FIG. 8A leads to the construction of stitched image E1 having unnatural joints.

In view of this, in the confocal microscope apparatus 100, when a plurality of first all-in-focus images are obtained and highly reliable measurement data is generated, the first image converter 121 performs an image conversion process of converting the plurality of all-in-focus images obtained in the image acquisition unit 110 into a plurality of second all-in-focus images (step S20).

As described above, when all images constituting a stitched image were obtained in the same brightness setting, the joints between the images are natural. Accordingly, in step S20, the first image converter 121 converts a plurality of first all-in-focus images into a plurality of second all-in-focus images so that images become close to a plurality of all-in-focus images obtained when a plurality of measurement visual field areas were captured in a reference brightness setting (i.e., in the same brightness setting). This reduces sense of strangeness that is caused by unnatural joints made when images were stitched together. Note that an all-in-focus image obtained when it is captured in a setting serving as a reference (which will be referred to as reference brightness setting) will hereinafter be referred to as a reference all-in-focus image.

Figure 9:
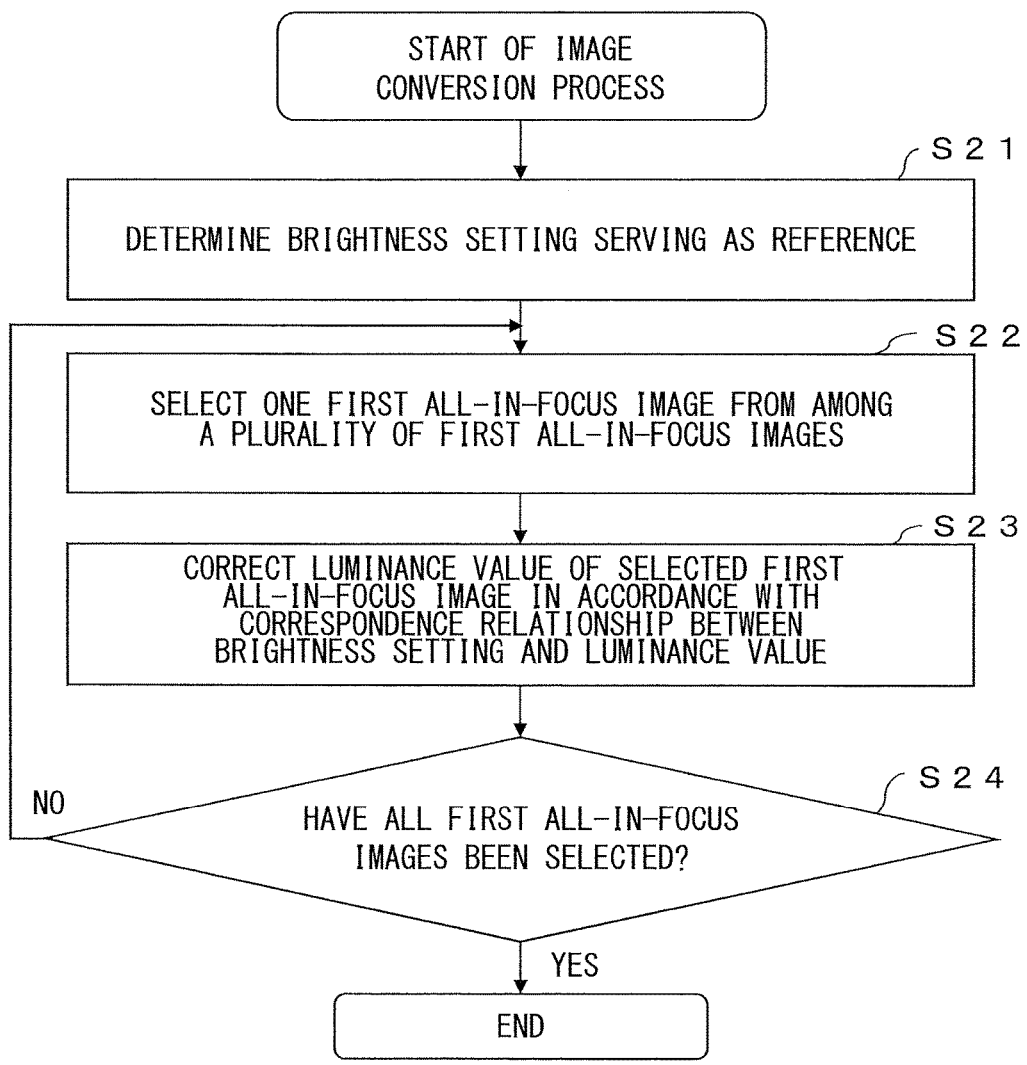
FIG. 9 is a flowchart of an image conversion process.

FIG. 9 shows a flowchart of an image conversion process performed in the confocal microscope apparatus 100. Hereinafter, specific explanations will be given for an example of an image conversion process performed in step S20 of FIG. 6, by referring to FIG. 9.

When an image conversion process is started, the first image converter 121 first determines a reference brightness setting (step S21). In this example, for example the highest brightness setting (amplification factor C), which is a brightness setting when first all-in-focus images E11, E13, E17 and E19 were obtained in step S10, is determined as a reference brightness setting.

It is desirable that a reference brightness setting be a brightness setting selected from among a plurality of brightness settings that correspond to a plurality of measurement visual field areas. This is because the number of correction target images can be reduced since first all-in-focus images obtained in a selected brightness setting do not have to received luminance correction, which will be described later. It is further desirable that a reference brightness setting be the highest brightness setting among a plurality of brightness settings corresponding to a plurality of measurement visual field areas. This is because loss of image information caused by luminance correction can be avoided.

Next, the first image converter 121 selects one first all-in-focus image from among a plurality of first all-in-focus images (step S22). Hereinafter, a selected first all-in-focus image will be referred to as a selected all-in-focus image.

Thereafter, the first image converter 121 corrects the luminance value of a selected all-in-focus image on the basis of a correspondence relationship between a setting value related to a brightness setting and the luminance value of a first all-in-focus image obtained by the image acquisition unit 110 (step S23). Note that a corrected image and an image on which a correction process has not been performed are referred to as second all-in-focus images. Also, by a correction, a luminance value may be a value exceeding the number of the luminance gradation of 12 bits (4096). Accordingly, a second all-in-focus image is managed as a digital image of a number of bits greater than 12, such as for example 16 bits.

Figure 10:
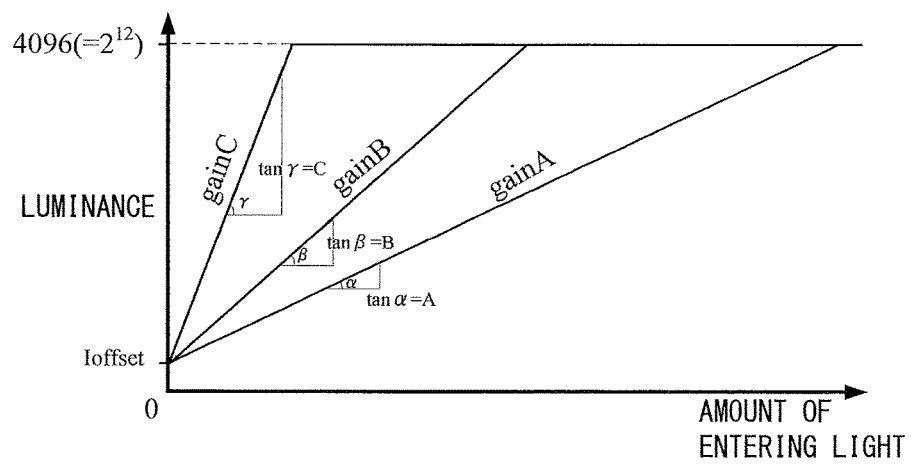
FIG. 10 shows a relationship between the amount of light entering an optical detector 11 and the luminance value of an image in the confocal microscope apparatus 100, for each brightness setting.

FIG. 10 shows a relationship between the amount of light entering the optical detector 11 and the luminance value of an image in the confocal microscope apparatus 100, for each brightness setting. FIG. 10 shows amplification factors (gain) as setting values related to brightness settings.

As shown in FIG. 10, in the confocal microscope apparatus 100, an increase in the amount of entering light increases the luminance value in proportion to the amount of entering light and the amplification factor until it reaches the saturation luminance (4096). Also, when the amount of entering light is zero, the luminance value is Ioffset and does not become zero regardless of the amplification factor. An image having a pixel with a luminance value of zero will cause various inconveniences in the analysis and processing of that image. Ioffset is an offset component that is intentionally provided for avoiding such a situation. Accordingly, in the confocal microscope apparatus 100, there is a relationship in which luminance values other than an offset component are in proportion to the amplification factors (brightness settings) when a fixed amount of entering light is assumed. This relationship is unique to the confocal microscope apparatus 100 and is stored in the storage unit 42 in advance. In step S23, on the basis of this relationship, the luminance value of a selected all-in-focus image is corrected so that the selected all-in-focus image becomes closer to a reference all-in-focus image.

Specifically, when the luminance value of the selected all-in-focus image is Ia and the amplification factor upon the obtainment of the selected all-in-focus image is A, the luminance value Ia' after the correction is calculated by the equation below.

$$Ia'=(C/A)(Ia-I\text{offset})+I\text{offset}$$

Also, when the luminance value of the selected all-in-focus image is Ib and the amplification factor upon the obtainment of the selected all-in-focus image is B, the luminance value Ib' after the correction is calculated by the equation below.

$$Ib'=(C/B)(Ib-I\text{offset})+I\text{offset}$$

Also, when the amplification factor upon the obtainment of the selected all-in-focus image is C, the luminance value Ic' after the correction is identical with the luminance value Ic before the correction (the luminance value of the selected all-in-focus image). Thus, the process in step S23 is omitted.

The above correction is possible because in the confocal microscope apparatus, an image from a position that is out of focus (blurred image) does not overlap a confocal image or an all-in-focus image, preventing the luminance value at a position of interest from being affected by the reflectance, the shape (degree of inclination), etc. of the surrounding positions thereof. In other words, because an adjacent measurement visual field area does not affect an all-in-focus image of a measurement visual field area of interest, it is possible to perform a correction separately for each of all-in-focus images of different measurement visual field areas.

When a luminance correction has terminated, the first image converter 121 determines whether or not all the first all-in-focus images have been selected (step S24), repeats the processes from step S22 through step S24 until all the first all-in-focus images are selected, and terminates the image conversion process in step S20.

Thereby, the luminance value of at least one of the plurality of first all-in-focus images obtained in the image acquisition unit 110 is corrected and a plurality of first all-in-focus images are converted into a plurality of second all-in-focus images.

When an image conversion process has terminated, the image stitching unit 122 in the confocal microscope apparatus 100 stitches a plurality of second all-in-focus images (step S30) together. In this example, an existing image stitching technique is used. For example, textures of overlapping area between adjacent second all-in-focus images are compared and adjacent second all-in-focus images are stitched together so that the textures correspond the most.

FIG. 11 exemplifies stitched image E2 constructed by stitching a plurality of second all-in-focus images together. In the stitched image E2 shown in FIG. 11, stitching with natural joints, causing no sense of strangeness is realized. Note that each of the plurality of second all-in-focus images E21 through E29 constituting stitched image E2 is a 16-bit digital image, and the number of the luminance gradation of each image is 65536.

Upon the termination of the stitching, the second image converter 123 performs a prescribed gradation conversion process on each of the pieces of image data of the plurality of second all-in-focus images constituting the stitched image E2 so as to convert the plurality of second all-in-focus images into a plurality of third all-in-focus images.

The prescribed gradation conversion process is performed for improving or adjusting the appearance of for example stitched image E2. An example of such a process is a gradation conversion process that relatively emphasizes a low gradation area of an image represented by image data, which is a process target, more than a high gradation area of that image. Also, it may be a gradation conversion process that performs a conversion in accordance with the preference of the microscope user. Further, the prescribed gradation conversion process may be performed for for example returning the number of bits of an image enlarged by an image conversion process to the original number of bits. An example of such a process is an image compression process in which a plurality of second all-in-focus image are compressed so that they will have the number of the same gradation as that of a plurality of first all-in-focus images.

Figure 12:
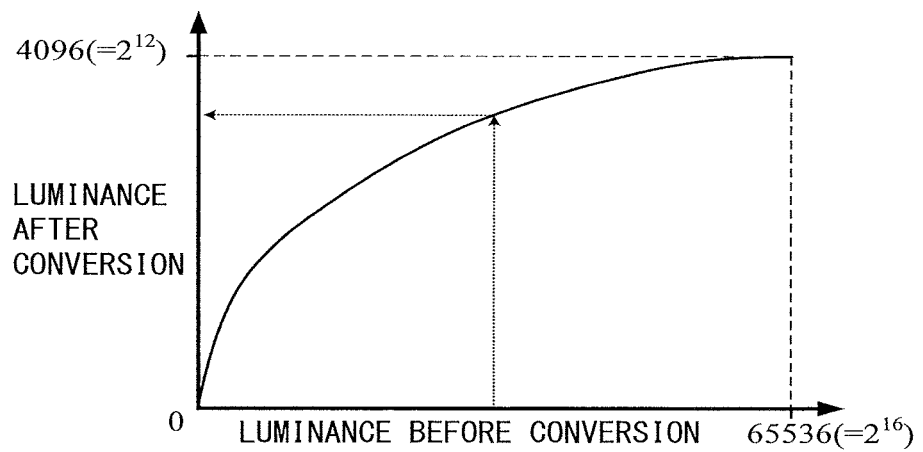
FIG. 12 shows a characteristic of a gradation conversion process performed by a second image converter 123.

FIG. 12 shows a characteristic of the gradation conversion process performed by the second image converter 123 and shows an output characteristic that changes logarithmically for an input. A gradation conversion process having the characteristic shown in FIG. 12 is a gradation conversion process that relatively emphasizes a low gradation area of an image more than a high gradation area of that image while compressing 16-bit data into 12-bit data.

In step S40, the second image converter 123 performs a gradation conversion process having the gradation characteristic shown in FIG. 12 on the image data of stitched image E2 in a lump. Thereby, a gradation conversion process having the gradation characteristic shown in FIG. 12 is performed on each of the pieces of image data of the plurality of second all-in-focus images constituting the stitched image E2. As a result of this, a plurality of second all-in-focus images are converted into a plurality of third all-in-focus images.

FIG. 13 exemplifies stitched image E3 constructed by stitching a plurality of third all-in-focus images together. Also in stitched image E3 shown in FIG. 13, stitching with natural joints, causing no sense of strangeness is realized similarly to stitched image E2 before the gradation conversion process shown in FIG. 11. This is because the same gradation conversion process is performed on each of a plurality of all-in-focus images constituting stitched image E2 shown in FIG. 11. Also, in stitched image E3, a low luminance area is emphasized relatively more than in stitched image E2. This results in high visibility of peripheries of a rigid sphere that is too dark to lead to low visibility in stitched image E2. Further, stitched image E3 is an image having the same number of bits as a confocal image output from the controller 30. This makes it easy to treat image data.

As described above, in the confocal microscope apparatus 100 according to the present embodiment, a height measurement is performed by obtaining an all-in-focus image in a brightness setting in accordance with a measurement visual field area. Thereafter, instead of stitching the obtained all-in-focus images together to construct a stitched image, an image conversion process of reducing the differences in brightness settings is performed on first all-in-focus images. By stitching thus obtained second all-in-focus images together, a stitched image is constructed. This makes it possible to realize both a highly reliable height measurement and construction of a stitched image with natural joints, causing no sense of strangeness. Also, by obtaining an all-in-focus image in a brightness setting in accordance with a measurement visual field area, a substantially wide dynamic range can be realized. This realizes excellent observation and measurement of the entire subject even when the subject causes a large difference between the amounts of reflected light.

While the present embodiment showed an example in which the image acquisition unit 110 changes a brightness setting by changing the value of a voltage applied to the amplifier 12 in accordance with a measurement visual field area, a brightness setting may be changed by changing the value of a voltage applied to the optical detector 11 in accordance with a measurement visual field area. Also, the image acquisition unit 110 may change a brightness setting by changing a drive current value of the laser 1 in accordance with a measurement visual field area. In other words, a brightness setting may be changed by changing the amount of light emitted from the laser 1 instead of the amplification factor of an analog signal. For example, when the amount of light entering the optical detector 11 is in proportion to the amount of light emitted from the laser 1, the luminance value of a first all-in-focus image increases in proportion to the amount of emitted light until it reaches a saturation luminance. The first image converter 121 may correct the luminance value of a first all-in-focus image on the basis of this relationship.

Also, in the present embodiment, a case has been shown in which the user of the confocal microscope apparatus 100 repeatedly specifies a brightness setting and confirms the brightness of an all-in-focus image displayed so that a brightness setting in accordance with a measurement visual field area is stored in the storage unit 42 in advance. However, the process of identifying a brightness setting in accordance with a measurement visual field area may be performed automatically by the confocal microscope apparatus 100. The confocal microscope apparatus 100 may repeatedly specify a brightness setting for each measurement visual field area and obtain an all-in-focus image so as to identify an appropriate brightness setting in accordance with a measurement visual field area so as to store it in the storage unit 42.

Figure 14:
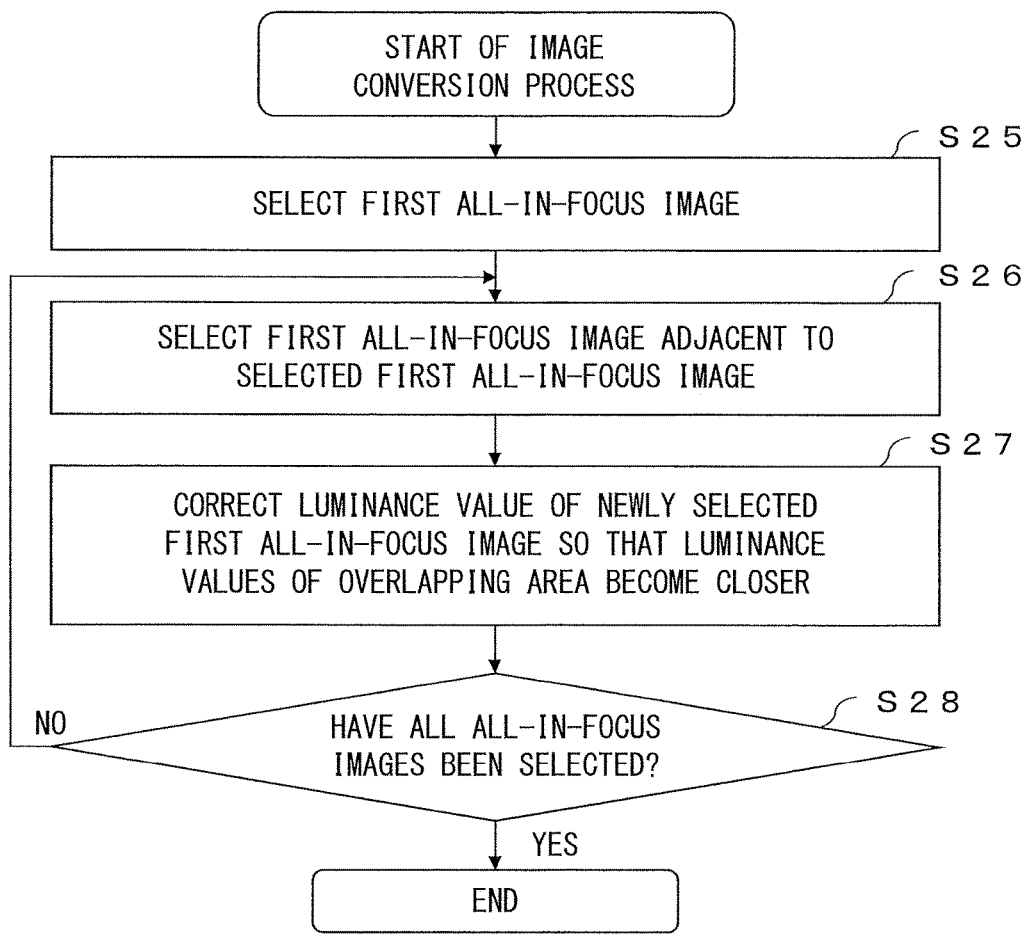
FIG. 14 is a flowchart of another image conversion process performed by the confocal microscope apparatus 100.

FIG. 14 is a flowchart of another image conversion process performed by the confocal microscope apparatus 100. While the present embodiment exemplified the image conversion process shown in FIG. 9 as an image conversion process performed by the confocal microscope apparatus 100, the image conversion process shown in FIG. 14 may be performed instead of the image conversion process shown in FIG. 9.

The image conversion process shown in FIG. 14 makes the first image converter 121 convert a plurality of first all-in-focus images into a plurality of second all-in-focus images so that the images become closer to a plurality of all-in-focus images obtained when a plurality of measurement visual field areas are captured in a brightness setting serving as a reference. This point is similar to the image conversion process shown in FIG. 9. However, specific procedures are different, and therefore specific explanations will be given hereinafter by referring to FIG. 14.

When an image conversion process is started, the first image converter 121 first selects one first all-in-focus image (step S25). In this example, a first all-in-focus image obtained in the highest brightness setting for example is selected. Next, an unselected all-in-focus image adjacent to a selected first all-in-focus image is selected (step S26).

Thereafter, the first image converter 121 corrects the luminance value of the first all-in-focus image selected newly in step S26 (step S27). In this example, the luminance value of the newly selected first all-in-focus image is corrected so that the luminance value of the first all-in-focus image selected newly for an area in which the measurement visual field area of the newly selected first all-in-focus image and the measurement visual field area of the already-selected first all-in-focus image adjacent to that image overlap each other and the luminance value of the already-selected first all-in-focus image for the area become closer.

FIG. 15A and FIG. 15B exemplify two adjacent first all-in-focus images. By referring to FIG. 15A and FIG. 15B, specific explanations will be given for an example of a luminance correction performed in step S27. First, characteristic areas (areas E41b and E42b) in overlapping areas (areas E41a and E42a) in which first all-in-focus image E41 serving as a correction target shown in FIG. 15A and first all-in-focus image E42 adjacent to first all-in-focus image E41 shown in FIG. 15B overlap is identified. A characteristic area is an area that serves as a guide for determining a position for stitching in an existing image stitching technique. Next, average luminance value Id of area E41b and average luminance value Ie of area E42b are calculated. Thereafter, on the basis of these average luminance values, the luminance value of first all-in-focus image E41 as a correction target is corrected.

Specifically, when the luminance value of first all-in-focus image E41 serving as a correction target before correction is IL, IL' after the correction is calculated by the equation below. When Ioffset is sufficiently small, Ioffset may be ignored.

$$IL'=\{(Ie-Ioffset)/(Id-Ioffset)\}(IL-Ioffset)+Ioffset$$

Figure 16:
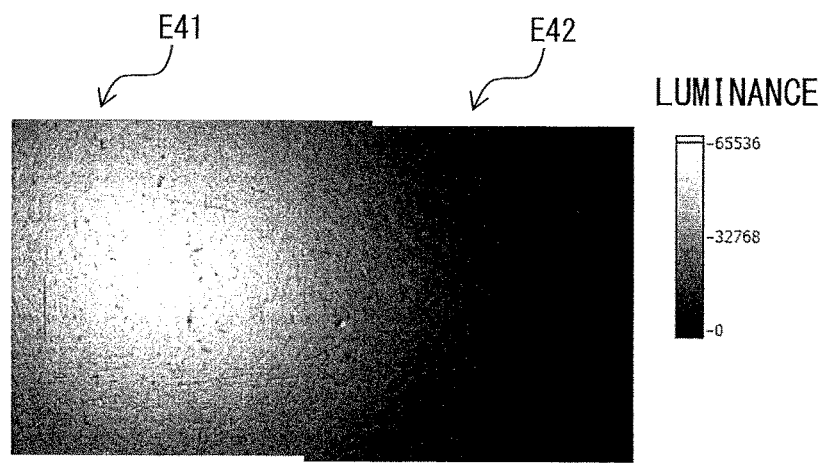
FIG. 16 exemplifies a situation where two adjacent first all-in-focus image have been stitched together after the correction of luminance values.

FIG. 16 exemplifies a situation where two adjacent first all-in-focus image have been stitched together after the correction of luminance values. As shown in FIG. 16, through the above correction, the luminance value of a characteristic area becomes closer, making also the luminance value of the overlapping area closer.

The first image converter 121 determines whether or not all first all-in-focus images have been selected (step S28), and repeats the processes in step S26 and step S27 until all first all-in-focus images are selected. In the above method as well, other first all-in-focus images are converted so that they become closer to a reference all-in-focus image that would be obtained when an image is captured in the brightness setting of the first all-in-focus image selected first.

Second Embodiment

Figure 17:
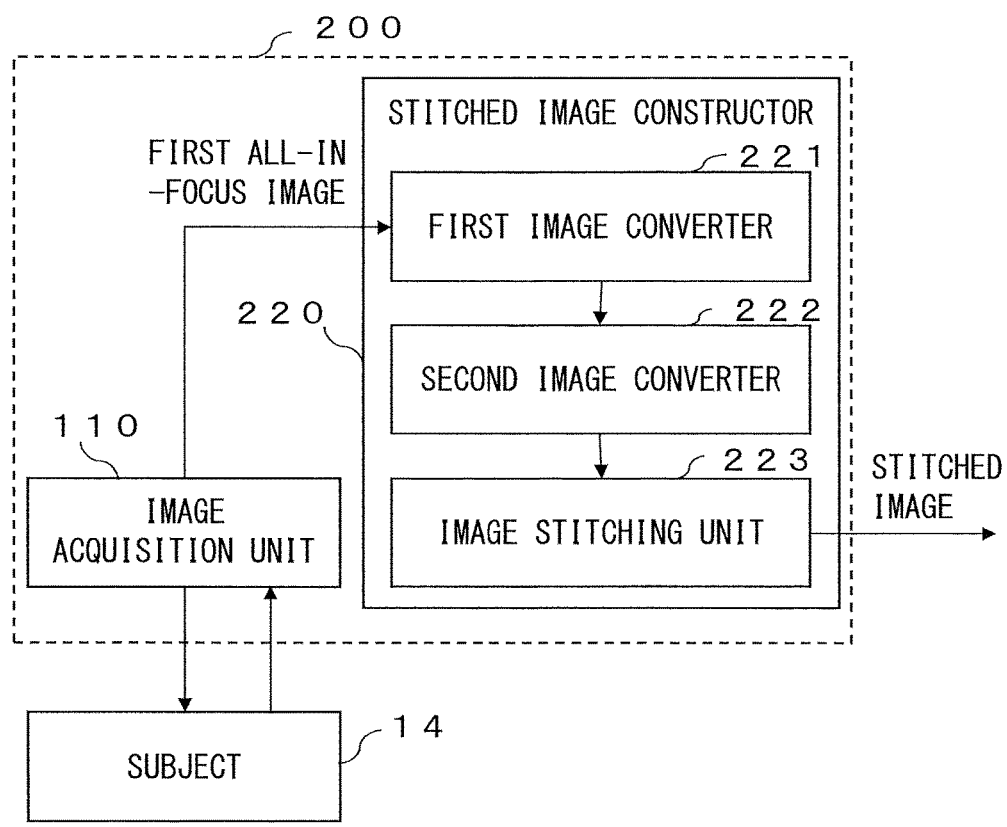
FIG. 17 is a functional block diagram of a confocal microscope apparatus 200 according to a second embodiment.

FIG. 17 is a functional block diagram of a confocal microscope apparatus 200. The confocal microscope apparatus 200 is different from the confocal microscope apparatus 100 shown in FIG. 5 in that it has a stitched image constructor 220 instead of the stitched image constructor 120. The stitched image constructor 220 includes a first image converter 221, a second image converter 222 and an image stitching unit 223.

FIG. 18 is a flowchart of a process performed by the confocal microscope apparatus 200. In the confocal microscope apparatus 200, when the height measurement and construction of a stitched image are started, the image acquisition unit 110 first obtains the all-in-focus image of each of a plurality of measurement visual field areas in a brightness setting in accordance with the measurement visual field area (step S110), and the first image converter 221 converts a plurality of first all-in-focus images into a plurality of second all-in-focus images (step S120). These processes are similar to those in step S10 and step S20 shown in FIG. 6.

Thereafter, the second image converter 222 performs a prescribed gradation conversion process on each of pieces of image data of the plurality of second all-in-focus images so as to convert the plurality of second all-in-focus images into a plurality of third all-in-focus images (step S130). Note that the prescribed gradation conversion process performed in step S130 is similar to the process in step S40 shown in FIG. 6. Lastly, the image stitching unit 223 stitches the plurality of third all-in-focus images together so as to construct a stitched image (step S140).

Also in the confocal microscope apparatus 200, similarly to the confocal microscope apparatus 100 of the first embodiment, a highly realizable height measurement and construction of a stitched image with natural joints, causing no sense of strangeness are both realized.

Third Embodiment

FIG. 19 is a functional block diagram of a confocal microscope apparatus 300. The confocal microscope apparatus 300 is different from the confocal microscope apparatus 100 shown in FIG. 5 in that it is provided with a stitched image constructor 320 instead of the stitched image constructor 120. The stitched image constructor 320 includes an image stitching unit 321, a first image converter 322 and a second image converter 323.

Figure 20:
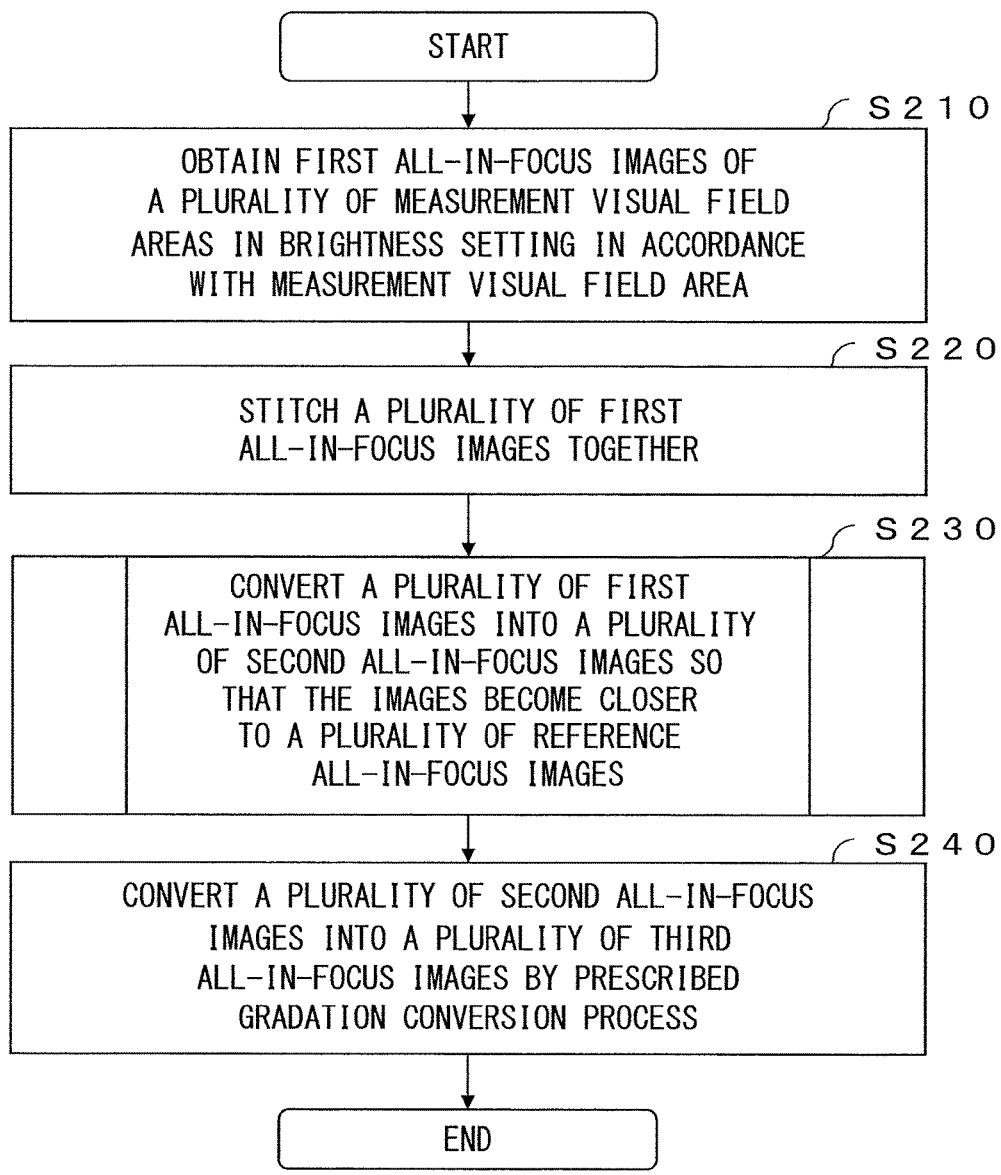
FIG. 20 is a flowchart of a process performed by the confocal microscope apparatus 300.

FIG. 20 is a flowchart of a process performed by the confocal microscope apparatus 300. In the confocal microscope apparatus 300, when the height measurement and construction of a stitched image are started, the image acquisition unit 110 first obtains the all-in-focus image of each of a plurality of measurement visual field areas in a brightness setting in accordance with the measurement visual field area (step S210). This process is similar to the process in step S10 shown in FIG. 6. Next, the image stitching unit 321 constructs a stitched image by stitching a plurality of first all-in-focus images together (step S220).

Thereafter, the first image converter 322 converts a plurality of first all-in-focus images constituting the stitched image into a plurality of second all-in-focus images (step S230). This conversion process is similar to the process in step S20 shown in FIG. 6. Lastly, a prescribed gradation conversion process is performed on each of the pieces of image data of a plurality of second all-in-focus images constituting the stitched image so as to convert the plurality of second all-in-focus images into a plurality of third all-in-focus images (step S240). The prescribed gradation conversion process performed in step S240 is similar to the process in step S40 shown in FIG. 6.

In the confocal microscope apparatus 300 as well, similarly to the confocal microscope apparatus 100 according to the first embodiment, it possible to realize both a highly reliable height measurement and construction of a stitched image with natural joints, causing no sense of strangeness.

Fourth Embodiment

Figure 21:
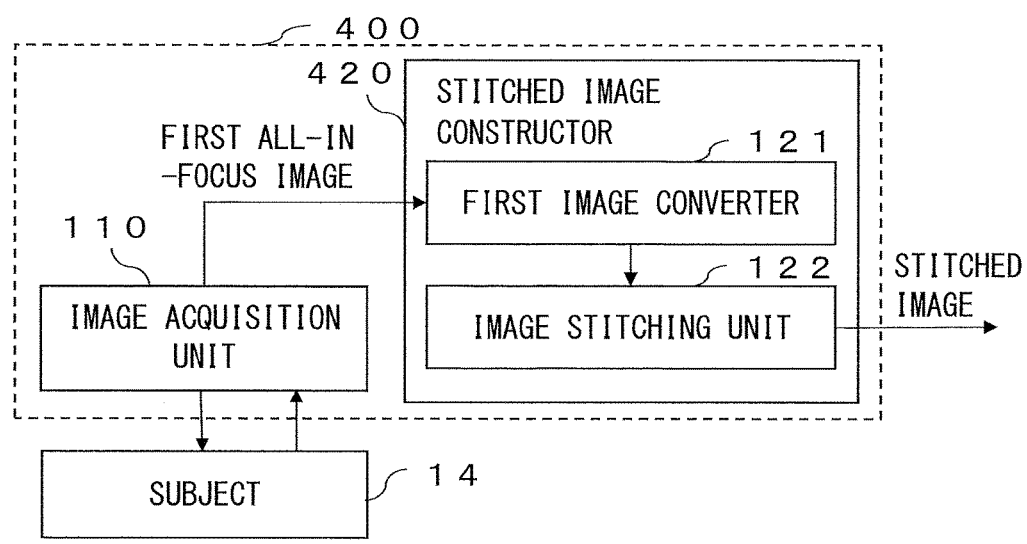
FIG. 21 is a functional block diagram of a confocal microscope apparatus 400 according to a fourth embodiment.

FIG. 21 is a functional block diagram of a confocal microscope apparatus 400. The confocal microscope apparatus 400 is different from the confocal microscope apparatus 100 shown in FIG. 5 in that it includes a stitched image constructor 420 instead of the stitched image constructor 120. Also, the stitched image constructor 420 is different from the stitched image constructor 120 in that it does not include a second image converter.

Figure 22:
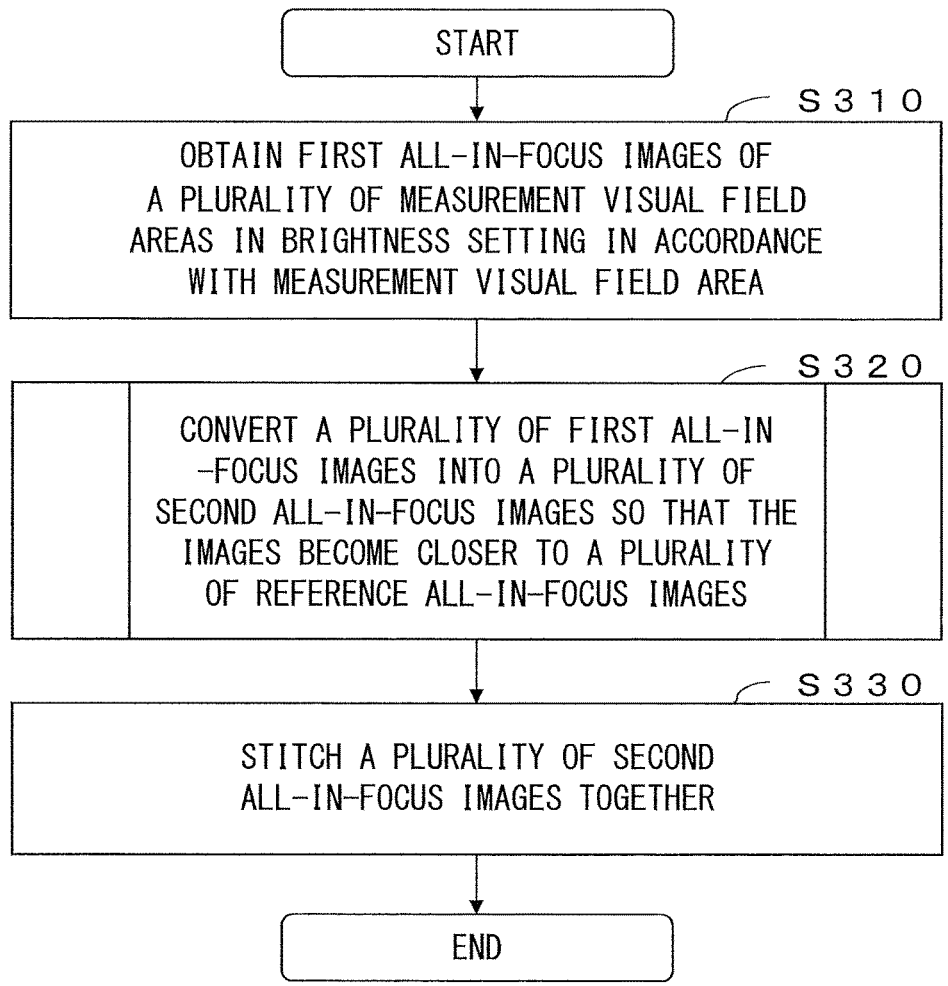
FIG. 22 is a flowchart of a process performed by the confocal microscope apparatus 400.

FIG. 22 is a flowchart of a process performed in the confocal microscope apparatus 400. In the confocal microscope apparatus 400, when the height measurement and construction of a stitched image are started, the image acquisition unit 110 first obtains the all-in-focus image of each of a plurality of measurement visual field areas in a brightness setting in accordance with the measurement visual field area (step S310). Further, the first image converter 121 converts a plurality of first all-in-focus images into a plurality of second all-in-focus images (step S320). These processes are similar to those in step S10 and step S20 shown in FIG. 6. Thereafter, the stitched image constructor 120 stitches a plurality of second all-in-focus images together so as to construct a stitched image, and the process is terminated.

In the confocal microscope apparatus 400 as well, similarly to the confocal microscope apparatus 100 according to the first embodiment, it possible to realize both a highly reliable height measurement and construction of a stitched image with natural joints, causing no sense of strangeness.

The above embodiments just show specific examples in order to facilitate understanding of the invention, and the embodiments of the present invention are not limited to the embodiments. The confocal microscope apparatuses, the stitched image construction methods and programs of the present invention can be modified and changed in various ways within the scope described in the claims. For example, while FIG. 2 exemplified an industrial confocal microscope apparatus, which is used for industries, the confocal microscope apparatuses of the present invention can also be applied to a biological confocal microscope apparatus such as a fluorescence microscope etc.

Also, the stitched image constructor is not limited to those in the above embodiments as long as it constructs a stitched image on the basis of a plurality of second all-in-focus images obtained through conversion of a plurality of first all-in-focus images so that the images become closer to a plurality of reference all-in-focus images. It is sufficient if a final stitched image is constructed on the basis of a plurality of second all-in-focus images. Accordingly, a conversion process performed so that images become closer to a plurality of reference all-in-focus images may be performed after the image stitching or may be performed before the image stitching. Also, "construct a stitched image on the basis of a plurality of second all-in-focus images" is not limited to a case where a stitched image is constructed in which a plurality of second all-in-focus images are stitched, but includes a case where a stitched image is constructed in which a plurality of third all-in-focus images that are obtained by further performing a gradation conversion process on the plurality of second all-in-focus images are stitched together.

Also, it is sufficient if a first image converter converts a plurality of first all-in-focus images so that the images become closer to a plurality of reference all-in-focus images as a result regardless of specific methods thereof. Specifically, it may be a method other than one in which the luminance value of a first all-in-focus image is corrected on the basis of a correspondence relationship with the luminance value of a first all-in-focus image and a setting value related to a brightness setting. It may also be a method other than one in which the luminance value of a first all-in-focus image is corrected so that the luminance value of two or more first all-in-focus images corresponding to an area included in two or more measurement visual field areas in an overlapping manner become closer.

Also, a first all-in-focus image is obtained mainly for performing a highly accurate height measurement.

Accordingly, it is sufficient if a plurality of first all-in-focus images are obtained in such a brightness setting that each of the plurality first of all-in-focus images has a brightness in a prescribed range that allows the securement of specific measurement accuracy.

What is claimed is:

1. A confocal microscope apparatus comprising:
    an image acquisition unit configured to obtain a first all-in-focus image of each of a plurality of measurement visual field areas in a brightness setting in accordance with the corresponding measurement visual field area, the plurality of measurement visual field areas constituting a measurement target area which is a target of a measurement; and
    a stitched image constructor configured to construct a stitched image based on a plurality of second all-in-focus images, the plurality of second all-in-focus images being obtained through conversion of the plurality of first all-in-focus images obtained by the image acquisition unit so that the images become closer to a plurality of reference all-in-focus images, and the plurality of reference all-in-focus images being obtained when the plurality of measurement visual field areas are captured in a brightness setting serving as a reference,
    wherein the stitched image constructor includes:
        a first image converter configured to convert the plurality of first all-in-focus images into the plurality of second all-in-focus images so that the images become closer to the plurality of reference all-in-focus images; and
        a second image converter configured to convert the plurality of second all-in-focus images into a plurality of third all-in-focus images by performing a prescribed gradation conversion process on each of pieces of image data of the plurality of second all-in-focus images, and wherein the prescribed gradation conversion process is a gradation conversion process that relatively emphasizes a low gradation area of the plurality of second all-in-focus images more than a high gradation area of the plurality of second all-in-focus images.

2. A confocal microscope apparatus comprising:
an image acquisition unit configured to obtain a first all-in-focus image of each of a plurality of measurement visual field areas in a brightness setting in accordance with the corresponding measurement visual field area, the plurality of measurement visual field areas constituting a measurement target area which is a target of a measurement; and
a stitched image constructor configured to construct a stitched image based on a plurality of second all-in-focus images, the plurality of second all-in-focus images being obtained through conversion of the plurality of first all-in-focus images obtained by the image acquisition unit so that the images become closer to a plurality of reference all-in-focus images, and the plurality of reference all-in-focus images being obtained when the plurality of measurement visual field areas are captured in a brightness setting serving as a reference,
wherein the stitched image constructor includes:
a first image converter configured to convert the plurality of first all-in-focus images into the plurality of second all-in-focus images so that the images become closer to the plurality of reference all-in-focus images; and
a second image converter configured to convert the plurality of second all-in-focus images into a plurality of third all-in-focus images by performing a prescribed gradation conversion process on each of pieces of image data of the plurality of second all-in-focus images, and
wherein the prescribed gradation conversion process is a gradation conversion process that converts the plurality of second all-in-focus images into the plurality of third all-in-focus images having a same number of gradation as the plurality of first all-in-focus images.

3. A confocal microscope apparatus comprising:
an image acquisition unit configured to obtain a first all-in-focus image of each of a plurality of measurement visual field areas in a brightness setting in accordance with the corresponding measurement visual field area, the plurality of measurement visual field areas constituting a measurement target area which is a target of a measurement; and
a stitched image constructor configured to construct a stitched image based on a plurality of second all-in-focus images, the plurality of second all-in-focus images being obtained through conversion of the plurality of first all-in-focus images obtained by the image acquisition unit so that the images become closer to a plurality of reference all-in-focus images, and the plurality of reference all-in-focus images being obtained when the plurality of measurement visual field areas are captured in a brightness setting serving as a reference,
wherein the stitched image constructor includes a first image converter configured to convert the plurality of first all-in-focus images into the plurality of second all-in-focus images so that the images becomes closer to the plurality of reference all-in-focus images, and
wherein the first image converter is configured to correct a luminance value of at least one of the plurality of first all-in-focus images based on a correspondence relationship between a setting value related to a brightness setting and a luminance value of a first all-in-focus image obtained by the image acquisition unit.

4. A confocal microscope apparatus comprising:
an image acquisition unit configured to obtain a first all-in-focus image of each of a plurality of measurement visual field areas in a brightness setting in accordance with the corresponding measurement visual field area, the plurality of measurement visual field areas constituting a measurement target area which is a target of a measurement; and
a stitched image constructor configured to construct a stitched image based on a plurality of second all-in-focus images, the plurality of second all-in-focus images being obtained through conversion of the plurality of first all-in-focus images obtained by the image acquisition unit so that the images become closer to a plurality of reference all-in-focus images, and the plurality of reference all-in-focus images being obtained when the plurality of measurement visual field areas are captured in a brightness setting serving as a reference,
wherein the stitched image constructor includes a first image converter configured to convert the plurality of first all-in-focus images into the plurality of second all-in-focus images so that the images becomes closer to the plurality of reference all-in-focus images, and
wherein the first image converter is configured to correct a luminance value of at least one of the plurality of first all-in-focus images so that luminance values that are of at least two of the plurality of first all-in-focus images and that correspond to an area included in at least two measurement visual field areas in an overlapped manner become closer.

5. A confocal microscope apparatus comprising:
an image acquisition unit configured to obtain a first all-in-focus image of each of a plurality of measurement visual field areas in a brightness setting in accordance with the corresponding measurement visual field area, the plurality of measurement visual field areas constituting a measurement target area which is a target of a measurement; and
a stitched image constructor configured to construct a stitched image based on a plurality of second all-in-focus images, the plurality of second all-in-focus images being obtained through conversion of the plurality of first all-in-focus images obtained by the image acquisition unit so that the images become closer to a plurality of reference all-in-focus images, and the plurality of reference all-in-focus images being obtained when the plurality of measurement visual field areas are captured in a brightness setting serving as a reference,
wherein the stitched image constructor includes:
a first image converter configured to convert the plurality of first all-in-focus images into the plurality of second all-in-focus images so that the images become closer to the plurality of reference all-in-focus images;
a second image converter configured to convert the plurality of second all-in-focus images into a plurality of third all-in-focus images by performing a prescribed gradation conversion process on each of pieces of image data of the plurality of second all-in-focus images; and
an image stitching unit configured to stitch together the plurality of first all-in-focus images, the plurality of second all-in-focus images, or the plurality of third all-in-focus images.

6. A confocal microscope apparatus comprising:
an image acquisition unit configured to obtain a first all-in-focus image of each of a plurality of measurement visual field areas in a brightness setting in accordance with the corresponding measurement visual field area, the plurality of measurement visual field areas constituting a measurement target area which is a target of a measurement; and
a stitched image constructor configured to construct a stitched image based on a plurality of second all-in-focus images, the plurality of second all-in-focus images being obtained through conversion of the plurality of first all-in-focus images obtained by the image acquisition unit so that the images become closer to a plurality of reference all-in-focus images, and the plurality of reference all-in-focus images being obtained when the plurality of measurement visual field areas are captured in a brightness setting serving as a reference,
wherein the brightness setting serving as the reference is a highest brightness setting from among a plurality of brightness settings corresponding to the plurality of measurement visual field areas.

7. A laser scanning confocal microscope apparatus comprising:
an image acquisition unit configured to obtain a first all-in-focus image of each of a plurality of measurement visual field areas in a brightness setting in accordance with the corresponding measurement visual field area, the plurality of measurement visual field areas constituting a measurement target area which is a target of a measurement; and
a stitched image constructor configured to construct a stitched image based on a plurality of second all-in-focus images, the plurality of second all-in-focus images being obtained through conversion of the plurality of first all-in-focus images obtained by the image acquisition unit so that the images become closer to a plurality of reference all-in-focus images, and the plurality of reference all-in-focus images being obtained when the plurality of measurement visual field areas are captured in a brightness setting serving as a reference,
wherein the brightness setting includes at least one of a setting related to a drive current of a laser light source included in the laser scanning confocal microscope apparatus and a setting related to a voltage applied to a photomultiplier or an avalanche photo diode included in the laser scanning confocal microscope apparatus.

8. The confocal microscope apparatus according to claim 1, wherein the image acquisition unit is configured to obtain the plurality of first all-in-focus images in such a brightness setting that each of the plurality of first all-in-focus images has a brightness in a prescribed range.

9. A stitched image construction method comprising:
obtaining a first all-in-focus image of each of a plurality of measurement visual field areas in a brightness setting in accordance with the corresponding measurement visual field area, the plurality of measurement visual field areas constituting a measurement target area which is a target of a measurement;
converting the plurality of first all-in-focus images into a plurality of second all-in-focus images so that the images become closer to a plurality of reference all-in-focus images, the plurality of reference all-in-focus images being obtained when the plurality of measurement visual field areas are captured in a brightness setting serving as a reference;
constructing a stitched image based on the plurality of second all-in-focus images; and
converting the plurality of second all-in-focus images into a plurality of third all-in-focus images by performing a prescribed gradation conversion process on each of pieces of image data of the plurality of second all-in-focus images, the prescribed gradation conversion process being a gradation conversion process that relatively emphasizes a low gradation area of the plurality of second all-in-focus images more than a high gradation area of the plurality of second all-in-focus images.

10. A non-transitory computer-readable medium having stored therein a program for causing a computer to execute processes comprising:
obtaining a first all-in-focus image of each of a plurality of measurement visual field areas in a brightness setting in accordance with the corresponding measurement visual field area, the plurality of measurement visual field areas constituting a measurement target area which is a target of a measurement;
converting the plurality of first all-in-focus images into a plurality of second all-in-focus images so that the images become closer to a plurality of reference all-in-focus images, the plurality of reference all-in-focus images being obtained when the plurality of measurement visual field areas are captured in a brightness setting serving as a reference;
constructing a stitched image based on the plurality of second all-in-focus images; and
converting the plurality of second all-in-focus images into a plurality of third all-in-focus images by performing a prescribed gradation conversion process on each of pieces of image data of the plurality of second all-in-focus images, the prescribed gradation conversion process being a gradation conversion process that relatively emphasizes a low gradation area of the plurality of second all-in-focus images more than a high gradation area of the plurality of second all-in-focus images.

* * * * *